US010764005B2

(12) United States Patent
Choi et al.

(10) Patent No.: US 10,764,005 B2
(45) Date of Patent: Sep. 1, 2020

(54) METHOD AND DEVICE FOR TRANSMITTING SIGNAL BY USING RESOURCE UNIT INCLUDING PLURALITY OF SUBCARRIERS

(71) Applicant: LG ELECTRONICS INC., Seoul (KR)

(72) Inventors: Jinsoo Choi, Seoul (KR); Hangyu Cho, Seoul (KR); Eunsung Park, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 15/521,552

(22) PCT Filed: Feb. 23, 2016

(86) PCT No.: PCT/KR2016/001754
§ 371 (c)(1),
(2) Date: Apr. 24, 2017

(87) PCT Pub. No.: WO2016/137201
PCT Pub. Date: Sep. 1, 2016

(65) Prior Publication Data
US 2017/0324525 A1  Nov. 9, 2017

Related U.S. Application Data

(60) Provisional application No. 62/120,870, filed on Feb. 25, 2015, provisional application No. 62/120,886, (Continued)

(51) Int. Cl.
*H04L 5/00* (2006.01)
*H04L 27/26* (2006.01)
(Continued)

(52) U.S. Cl.
CPC .......... *H04L 5/0007* (2013.01); *H04L 5/0039* (2013.01); *H04L 27/2602* (2013.01);
(Continued)

(58) Field of Classification Search
CPC . H04W 84/12; H04W 28/04; H04W 72/0453; H04L 27/26; H04L 5/0007;
(Continued)

(56) References Cited

U.S. PATENT DOCUMENTS

2008/0025267 A1    1/2008  Wei et al.
2010/0002675 A1    1/2010  Fu et al.
(Continued)

FOREIGN PATENT DOCUMENTS

CN    101977171    2/2011
CN    102036401    4/2011
(Continued)

OTHER PUBLICATIONS

IEEE 802.11-15/0330r1, OFDMA Numerology and Structure, Mar. 9, 2015 See slides 23-32. (Year: 2015).*
(Continued)

*Primary Examiner* — Jackie Zuniga Abad
(74) *Attorney, Agent, or Firm* — Lee, Hong, Degerman, Kang & Waimey

(57) ABSTRACT

The present specification presents a technique for transmitting a PPDU by using a resource unit including carriers of different sizes. For example, a PPDU is transmitted by using five frequency bands, a left guard band, and a right guard band. Null subcarriers can be included in the five frequency bands according to the type of included resource unit. The null subcarriers can be the leftmost side or the rightmost side of each frequency band, and the number of included null subcarriers can be determined according to the size of the carrier included in each resource unit or the type of resource
(Continued)

unit. A frequency band including DC carriers can include only one resource unit having a discontinuous carrier, and null subcarriers can be further included around the DC carriers.

25 Claims, 19 Drawing Sheets

Related U.S. Application Data filed on Feb. 26, 2015, provisional application No. 62/121,455, filed on Feb. 26, 2015, provisional application No. 62/127,293, filed on Mar. 3, 2015, provisional application No. 62/127,766, filed on Mar. 3, 2015.

(51) Int. Cl.
*H04L 29/08* (2006.01)
*H04W 84/12* (2009.01)

(52) U.S. Cl.
CPC .......... *H04L 27/2627* (2013.01); *H04L 29/08* (2013.01); *H04W 84/12* (2013.01)

(58) Field of Classification Search
CPC . H04L 5/0048; H04L 5/0039; H04L 27/2602; H04L 29/08; H04L 27/2627; H04B 17/24
See application file for complete search history.

(56) References Cited

U.S. PATENT DOCUMENTS

| | | |
|---|---|---|
| 2010/0273497 A1 | 10/2010 | Cho et al. |
| 2011/0164547 A1 | 7/2011 | Kim et al. |
| 2011/0255620 A1* | 10/2011 | Jones, IV ............. H04L 5/0046 375/260 |
| 2016/0142187 A1* | 5/2016 | Yang ................... H04L 27/2602 370/328 |
| 2016/0165598 A1* | 6/2016 | Azizi ................. H04W 72/0413 370/336 |

FOREIGN PATENT DOCUMENTS

| | | | |
|---|---|---|---|
| CN | 102415122 | 4/2012 | |
| JP | 2014515570 | 6/2014 | |
| WO | 2007132277 | 11/2007 | |
| WO | 2008038207 | 4/2008 | |
| WO | WO-2012112973 A1 * | 8/2012 | ........... H04L 5/0007 |
| WO | 2012158961 | 11/2012 | |

OTHER PUBLICATIONS

IEEE 802.11-15/0079r1, OFDM Numerology for 11ax, Jan. 12, 2015 See slides 4, 11-13. (Year: 2015).*
Japan Patent Office Application No. 2017-519861, Notice of Allowance dated Feb. 27, 2018, 3 pages.
Kim, Y. et al., "Considerations on 11ax OFDMA Frequency Granularity", doc.: IEEE 802.11-14/0082r1, Jan. 2015, 11 pages.
Chen, C. et al., "Proposed TGac Draft Amendment", doc.: IEEE 802.11-10/1361r3, Jan. 2011, 90 pages.
Lee, D. et al., "Numerology for 11ax", doc.: IEEE 802.11-15/0358r1, Mar. 2015, 15 pages.
Lee, et al., "OFDM Numerology for 11ax", doc.: IEEE 802.11-15/0079r1, Jan. 2015, 21 pages.
PCT International Application No. PCT/KR2016/001754 Written Opinion of the International Searching Authority dated Jun. 8, 2016, 6 pages.
European Patent Office Application Serial No. 16755851.9, Search Report dated Aug. 24, 2018, 6 pages.
Chinese application No. 201680003331.8, Office Action dated Sep. 4, 2019, 5 pages.
Chinese application No. 201680003331.8, Notice of Allowance dated Apr. 24, 2020, 4 pages.

* cited by examiner

METHOD AND DEVICE FOR TRANSMITTING SIGNAL BY USING RESOURCE UNIT INCLUDING PLURALITY OF SUBCARRIERS

CROSS-REFERENCE TO RELATED APPLICATIONS

This application is the National Stage filing under 35 U.S.C. 371 of International Application No. PCT/KR2016/001754, filed on Feb. 23, 2016, which claims the benefit of U.S. Provisional Application No. 62/120,870, filed on Feb. 25, 2015, 62/120,886, filed on Feb. 26, 2015, 62/121,455, filed on Feb. 26, 2015, 62/127,293, filed on Mar. 3, 2015, and 62/127,766, filed on Mar. 3, 2015, the contents of which are all hereby incorporated by reference herein in their entirety.

BACKGROUND OF THE INVENTION

Field of the Invention

This specification relates to wireless communication and, most particularly, to a method and device for transmitting data for at least one receiving station by using a combination of resource units including a plurality of subcarriers in a Wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An example of this specification proposes a method and device for efficiently performing communication in a case when a plurality of resource units are being used.

Technical Solutions

This specification proposes a method and device that may be used in a wireless LAN system. The corresponding method includes configuring a PPDU (Physical Protocol Data unit) by using at least one resource unit being allocated for a data field of a receiving station, and transmitting the PPDU to the receiving station through a first predetermined band, wherein the first predetermined band may include first to fifth frequency bands each being contiguous with one another, a left guard band being contiguous with the first frequency band, and a right guard band being contiguous with the fifth frequency band.

In this case, in case a 1st type or 2nd type RU is allocated to the first frequency band, a leftmost subcarrier of the first frequency band may be configured of null subcarriers.

Also, in case a 1st type or 2nd type RU is allocated to the second frequency band, a leftmost subcarrier of the second frequency band may be configured of the null subcarriers.

Also, in case a 3rd type RU is allocated to the first and second frequency bands, the null subcarriers may not be inserted to the first and second frequency bands.

Also, in case the 1st type or 2nd type RU is allocated to the fourth frequency band, a rightmost subcarrier of the fourth frequency band may be configured of the null subcarriers.

Also, in case the 1st type or 2nd type RU is allocated to the fifth frequency band, a rightmost subcarrier of the fifth frequency band may configured of the null subcarriers.

Also, in case the 3rd type RU is allocated to the fourth and fifth frequency bands, the null subcarriers may not be inserted in the fourth and fifth frequency bands.

Furthermore, the 3rd type RU may include a larger number of subcarriers as compared to the 2nd type RU, and the 2nd type RU may include a larger number of subcarriers as compared to the Type-1 resource unit.

Effects of the Invention

An example of this specification proposes a resource unit allocation method in which the interference in multiple resource units may be mitigated, in a case when a plurality of resource units are being used. For example, the method of this specification may achieve the effect of mitigating the influence of interference, in a case when multiple resource units are allocated to multiple receiving stations by adequately positioning null subcarriers and resource units.

DESCRIPTION OF EXEMPLARY EMBODIMENTS

Figure 1:
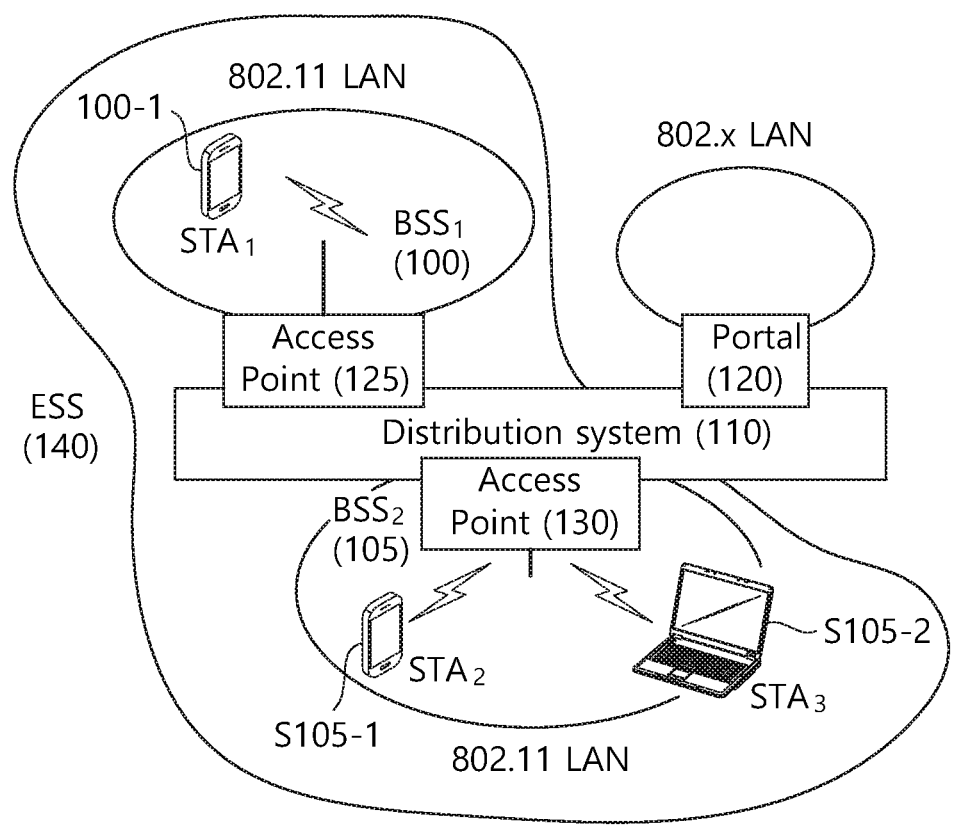
FIG. 1 is a conceptual view illustrating the structure of a wireless local area network (WLAN).
Figure 1:
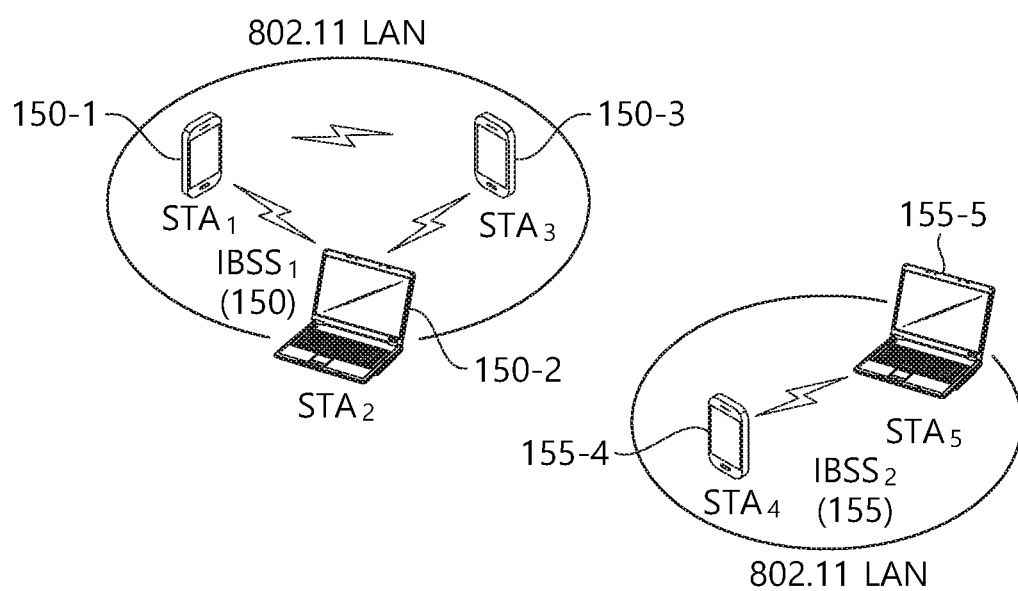

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the WirelessLAN system according to this exemplary embodiment may be as described below.

More specifically, a high efficiency PPDU (HE PPDU) according to this exemplary embodiment may be divided into a first part and a second part, wherein the first part may include fields related to a legacy system, and wherein the second part may include fields related to the HE system. The second part may include HE-STF, HE-LTF, and Data field, which will hereinafter be described in detail, and the first part may include L-STF, L-LTF, L-SIG, and so on.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared to the first part of the HE PPDU, the 4-times size of the FFT/IFFT may be applied to the second part of the HE PPDU. For example, 256FFT/IFFT may be applied for a 20 MHz bandwidth, 512FFT/IFFT may be applied for a 40 MHz bandwidth, 1024FFT/IFFT may be applied for an 80 MHz bandwidth, and 2048FFT/IFFT may be applied to a contiguous 160 MHz bandwidth or a non-contiguous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system. More specifically, a first part of the HE PPDU may adopt subcarrier spacing having the size of 312.5 kHz, which corresponds to a subcarrier spacing of the related art, and a second part of the HE PPDU may adopt subcarrier spacing having the size of 78.125 kHz, which corresponds to a subcarrier spacing of the related art.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 µs and N=4, in the WirelessLAN system according to this exemplary embodiment, the IDFT/DFT length may be equal to 3.2 µs*4(=12.8 µs). More specifically, the IDFT/DFT length that is applied for each symbol of the first part of the HE PPDU may correspond to 3.2 µs, and the IDFT/DFT length that is applied for each symbol of the second part of the HE PPDU may correspond to 3.2 µs*4(=12.8 µs).

The length of an OFDM symbol may correspond to the IDFT/DFT length having a length of a guard interval (GI) added thereto. The length of the GI may have diverse values, such as 0.4 µs, 0.8 µs, 1.6 µs, 2.4 µs, and 3.2 µs.

In case an OFDMA based method and device according to this exemplary embodiment are being used, resource allocation units that are defined to have different sizes may be used. The corresponding resource allocation unit may be expressed by using diverse terms, such as unit, resource unit, frequency unit, and so on, and the size of each unit may be expressed in tone units corresponding to the subcarrier. The resource unit may be diversely configured. For example, the resource unit may be defined to have diverse sizes, such as 26, 52, and 56 tones.

A resource unit may be allocated within the entire bandwidth (or available bandwidth) while considering a left guard tone and a right guard tone, which are positioned at both ends of the entire bandwidth in order to mitigate interference, and a direct current (DC) tone, which is positioned at the center of the entire bandwidth. The resource unit may also be allocated while considering leftover tones (or remaining tones) that may be used for the purpose of user allocation separation (or per-STA resource allocation), common pilot, automatic gain control (AGC), phase tracking, and so on.

The method for allocating resource units (number of allocations, allocation positions, and so on) within the entire bandwidth may be configured while considering resource usage efficiency, scalability (or extendibility) in accordance with the entire bandwidth. The method for allocating resource units may be pre-defined or may be signaled based on diverse methods (e.g., signaling based on a signal field that is included in a PPDU header of a PPDU).

Additionally, according to this exemplary embodiment, a virtual allocation resource unit including a tone that corresponds to a combination between at least a plurality of resource units, may be defined, and resource allocation based on the virtual allocation resource unit may be performed. The resource allocation based on the virtual allocation resource unit may be alternatively expressed as virtualization.

The virtual allocation resource unit may correspond to a resource unit for re-using the interleaver size and the OFDM numerology (or tone numerology) of the legacy WirelessLAN system.

More specifically, in case 242 tones are allocated to one STA, the legacy pilot allocation and the legacy interleaver size may be used. More specifically, among the 242 tones, 8 tones are allocated as pilot tones, and the remaining 234 tones may be allocated for the data tones. An interleaving process based on a 234-size interleaver may be performed on the 234-tone data tone.

In this case, a data interleaving procedure and a pilot tone insertion procedure may be performed identically as the legacy STA that has been allocated with 242 tones. More specifically, even in a case when the 242-tone structure is not physically supported, a virtual 242-tone resource unit may be allocated to the STA. In this case, an interleaving procedure using the legacy 234-size interleaver and an insertion procedure of the legacy pilot tone (8 pilot tones) may be used. Such 242-tone resource unit may be expressed by using a term that is referred to as a virtual allocation resource unit. The virtual allocation resource unit may correspond to 242 tones or a multiple of 242 tones (e.g., 484, 968, and so on). Alternatively, the size of the virtual allocation resource unit may also be decided based on another interleaver size (108, 52, 24, and so on) that was used in the legacy WirelessLAN system.

According to this exemplary embodiment, the tone numerology corresponding to each of the bandwidths 20 MHz, 40 MHz, and 80 MHz may be as described below. The following resource allocation method for each of the bandwidths is merely exemplary, and, therefore, resource allocation may be performed for each of the bandwidths by using other diverse methods apart from the method that will be presented below.

For example, 6 tones may be defined as the left guard tone, 3 tones may be defined as the direct current (DC) tone, and 5 tones may be defined for the 20 MHz bandwidth, and 2 56-tone resource units and 5 26-tone resource units may be allocated within the bandwidth. Alternatively, 9 26-tone resource units may be allocated as the virtual allocation resource unit.

For example, a detailed allocation within the 20 MHz frequency band may correspond to 56/26/26/13/DC/13/26/26/56 or 26/26/13/56/DC/56/13/26/26. Herein, '56' indicates a 56-tone resource unit, '26' indicates a 26-tone resource unit, and '13' indicates a 13-tone resource unit, which corresponds to 26 tones divided in half.

Figure 2:
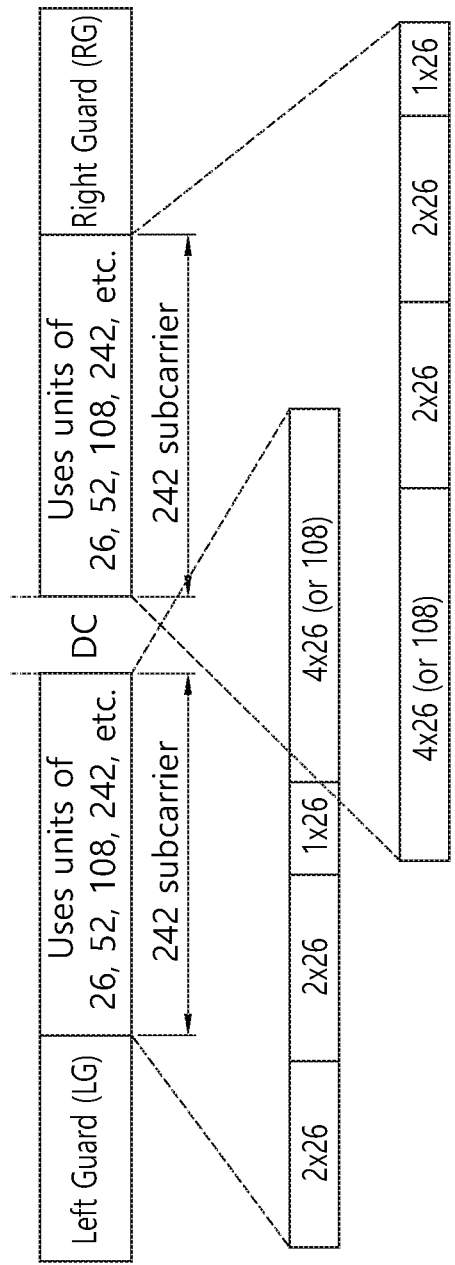
FIG. 2 is a drawing showing exemplary resource unit (RU) allocation/layout in a 40 MHz bandwidth.

FIG. 2 is a drawing showing exemplary resource unit (RU) allocation/layout in a 40 MHz bandwidth.

For example, for the 40 MHz bandwidth, the number of tones in a Left Guard (LG) is defined to be equal to 12 tones, the number of DC tones is defined to be equal to 5 tones, and the number of tones in a Right Guard (RG) is defined to be equal to 11 tones, and the remaining 484 tones may be divided in half.

More specifically, as shown in FIG. 2, a 26-tone resource unit (RU) may be positioned, or a 52(=2*26)-tone resource unit (RU) may be positioned, or a 108(=4*26)-tone resource unit (RU) may be positioned in the 242 tones of the Left Guard (LG), and such combination may be configured in diverse numbers. Additionally, as shown in FIG. 2, diverse combinations of 26-RUs, 52-RUs, and 108-RUs may also be positioned in the 242 tones of the Right Guard (RG). Moreover, it may also be possible to position a 242-RU.

Figure 3:
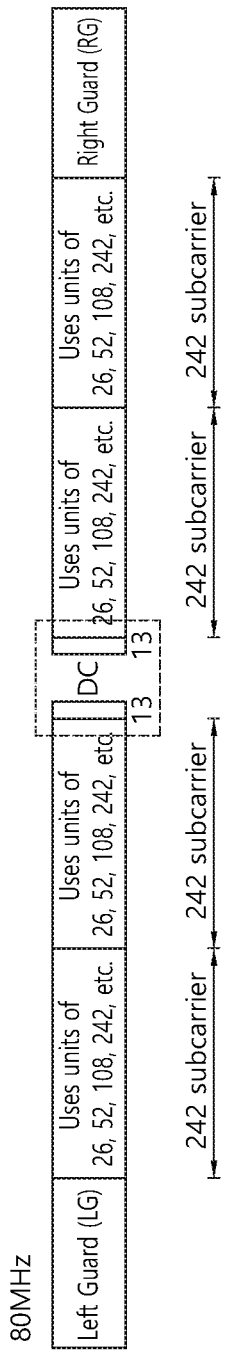
FIG. 3 is a drawing showing exemplary resource unit (RU) allocation/layout in an 80 MHz bandwidth.

FIG. 3 is a drawing showing exemplary resource unit (RU) allocation/layout in an 80 MHz bandwidth.

For example, for the 80 MHz bandwidth, the number of tones in a Left Guard (LG) is defined to be equal to 12 tones, the number of DC tones is defined to be equal to 7 tones, and the number of tones in a Right Guard (RG) is defined to be equal to 11 tones, and the remaining 994 tones may be divided in half based on the DC tone.

More specifically, as shown in FIG. 3, 2 242-chunks are positioned in the Left Guard (LG), and 26-RU, 52-RU, and 108-RU may be diversely positioned in each 242-chunk. This is the same in the Right Guard (RG). The RU layout in the left side and the right side may be identically or differently configured based on the DC tone.

The allocation of resource units and the respective layout of leftover tones in a 20 MHz bandwidth will hereinafter be described in detail.

In the example of the 20 MHz bandwidth, which will be described below, the number of tones of the Left Guard (LG) may be equal to 6, the number of tones of the Right Guard (RG) may be equal to 5, and the number of DC tones may be equal to 3. Just as in the case of the 40 MHz or 80 MHz bandwidth, the resource layout in the 20 MHz bandwidth, which will be described below, may be applied to the OFDMA PPDU. Additionally, the example that will hereinafter be described proposes a method for performing a layout of leftover tones when a case of allocating 242-chunk tones to 26-RU, 52-RU, and 106-RU (or 107-RU) occurs, wherein the 242-chunk tones respectively exist in both the left and right sides of the DC tone in the 20 MHz bandwidth. More specifically, 8, 4, or 2 leftover tones are generated in accordance with the size of the RU, and the example that will be described below proposes a method for effectively laying out such leftover tones.

Figure 4:
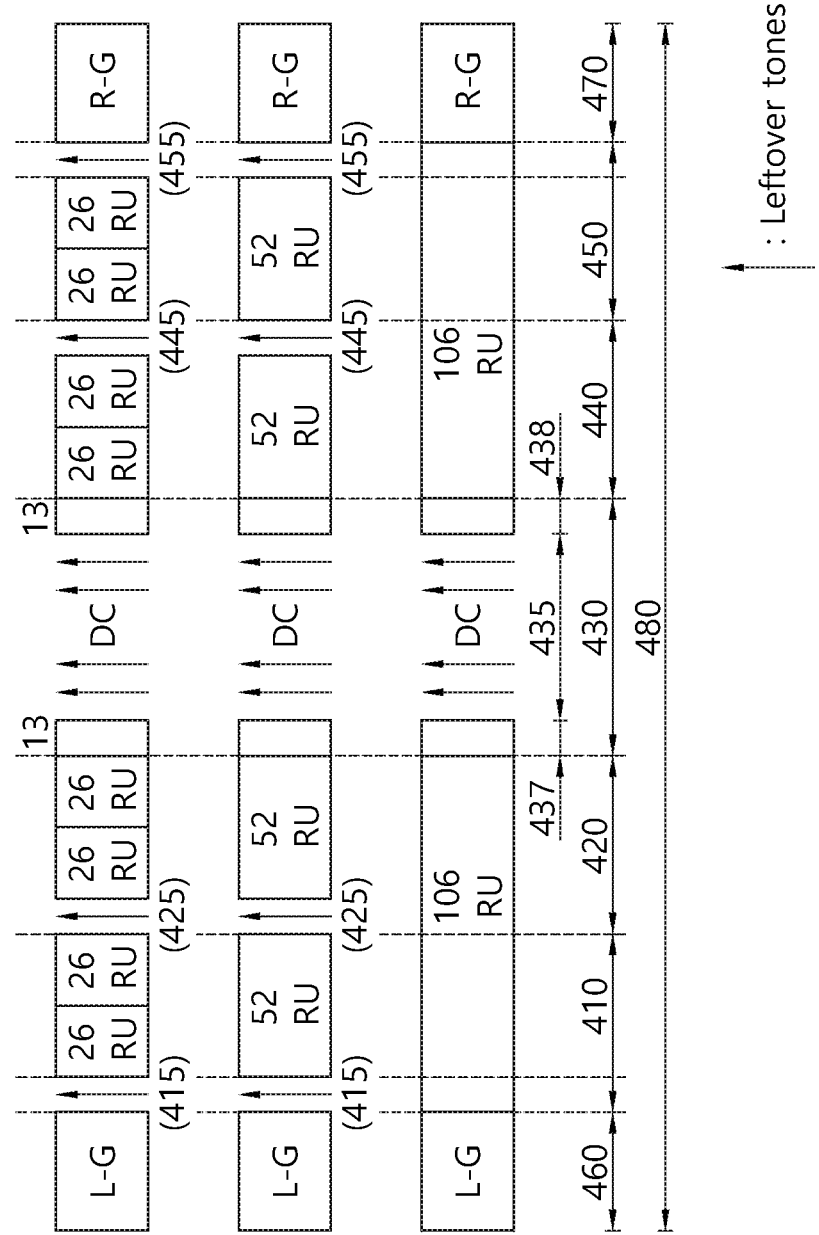
FIG. 4 is a drawing showing an exemplary method for allocating resource units and leftover tones in a 20 MHz bandwidth according to an exemplary embodiment of the present invention.

FIG. 4 is a drawing showing an exemplary method for allocating resource units and leftover tones in a 20 MHz bandwidth according to an exemplary embodiment of the present invention.

As shown in the drawing, the example of FIG. 4 relates to a method for transmitting a PPDU through a predetermined bandwidth 480. The predetermined bandwidth 480 may correspond to 20 MHz. The predetermined bandwidth 480 includes first to fifth frequency bands 410, 420, 430, 440, and 450, which are contiguous with one another. Meanwhile, the first frequency band 410 is also contiguous with a left guard band 460, and the fifth frequency band 450 is also contiguous with the right guard band 470.

Although the example of FIG. 4 discloses an example of using 26-RU, 52-RU, and 106-RU, the size (i.e., the number of tones/subcarriers that are included) of each RU is variable. The 3 types RUs in FIG. 4 may be expressed as first to third resource units (RU).

According to the example of FIG. 4, in case the $1^{st}$ type RU (i.e., 26-RU) or the 2nd type RU (i.e., 52-RU) is included in the first frequency band 410, which is contiguous with the left guard band 460, it is preferable that the leftmost subcarrier 415 of the first frequency band 410 is configured of 1 null subcarrier. This corresponds to a method for mitigating interference caused by aliasing from bands that are difference from one another (i.e., bands other than the predetermined band 480). However, in case the 3rd type RU (i.e., 106-RU) is allocated throughout the first frequency band 410 and the second frequency band 420, it is preferable that a null subcarrier is not included in the first and second frequency bands 410 and 420. Since the 3rd type RU has a relatively larger number of subcarriers, even if interference occurs from another band, the likelihood of data recovery is higher. Therefore, in case the 3rd type RU (i.e., 106-RU) is included in consideration of an overhead caused by the presence (or existence) of a null subcarrier, it is preferable that the leftmost null subcarrier 415 of the first frequency band 410 and the leftmost null subcarrier 425 of the second frequency band 420 are omitted.

Meanwhile, in the first frequency band 410, a maximum of two 1st type RUs (i.e., 26-RUs) may be included, and, in case the 2nd type RU (i.e., 52-RU) is included, 1 RU may be included. In case two $1^{st}$ type RUs (i.e., 26-RUs) are included in the first frequency band 410, the null subcarrier between the 2 resource units is omitted. In case a null subcarrier is inserted in the corresponding position, a problem of alignment with the 2nd type RU (i.e., 52-RU) may occur, and this is to prevent an increase in the overhead due to an excessive insertion of null subcarriers. This characteristic is commonly applied to each of the second, fourth and fifth frequency bands 420, 440, and 450, which will be described below.

According to the example of FIG. 4, 1 null subcarrier may be included between the first frequency band 410 and the second frequency band 420. More specifically, in case the $1^{st}$ type RU (i.e., 26-RU) is included in the second frequency band 420, or, in case the 2nd type RU (i.e., 52-RU) is included, it is preferable that the leftmost null subcarrier 425 of the second frequency band 420 is inserted.

In case the 1st type or 2nd type RU is allocated to different users, since the leftmost null subcarrier 425 of the second frequency band 420 may reduce the interference being generated between the users, this may be more effective in a case when the UL-OFDMA, and so on, is used. In case a 3rd type RU (i.e., 106-RU) is inserted throughout the first and second frequency bands 410 and 420, it is preferable that such leftmost null subcarrier 425 of the second frequency band 420 is omitted.

Meanwhile, it is more preferable that the third frequency band 430, which corresponds to the central frequency band, includes a DC tone (e.g., 3 tones) and 4 additional leftover tones at its center area. Additionally, it is preferable that $1^{st}$ type RU (i.e., 26-RUs) are respectively positioned on a left side portion 437 and a right side portion 438 of the third frequency band 430. More specifically, it is preferable that only the $1^{st}$ type RUs (i.e., 26-RUs) are allocated to the third frequency band 430 and that 2nd or 3rd type RI are not allocated to the third frequency band 430. Meanwhile, as shown in the drawing, it is preferable that each of the left side portion 437 and the right side portion 438 of the third frequency band 430 includes 13 subcarriers.

The example of FIG. 4 may mitigate the influence of the interference, which is caused during a procedure of additionally positioning leftover tones near the DC tone (e.g., 3 tones), thereby supplementing the insufficient number of DC tones, and configuring the third frequency band 430, or the influence of an error leakage. The example of FIG. 4 is described in accordance with a method of including 4 leftover tones near 3 DC tones. However, by marking all of the 3 DC tones and the 4 leftover tones as the DC tones, it may be possible to indicate that 7 DC tones 435 are included in the third frequency band 430.

There is a case when 1 null subcarrier may be included between the fourth frequency band 440 and the fifth frequency band 450. More specifically, in case the 1$^{st}$ type RU (i.e., 26-RU) is included in the fourth frequency band 440, or in case a 2nd type RU (i.e., 52-RU) is included, it is preferable that a rightmost null subcarrier 445 of the fourth frequency band 440 is inserted.

Additionally, there is a case when 1 null subcarrier may be included between the fifth frequency band 450 and the right guard band 470. More specifically, in case the 1$^{st}$ type RU (i.e., 26-RU) is included in the fifth frequency band 450, or in case a 2nd type RU (i.e., 52-RU) is included, it is preferable that a rightmost null subcarrier 455 of the fifth frequency band 450 is inserted.

Meanwhile, in case the 3rd type RU (i.e., 106-RU) is allocated throughout the fourth frequency band 440 and the fifth frequency band 450, it is preferable that a null subcarrier is not included the fourth and fifth frequency bands 440 and 450. Since the 3rd type RU a relatively larger number of subcarriers, even if interference occurs from another band, the likelihood of data recovery is higher. Therefore, in case the 3rd type RU (i.e., 106-RU) is included in consideration of an overhead caused by the presence (or existence) of a null subcarrier, it is preferable that the rightmost null subcarrier 445 of the fourth frequency band 440 and the rightmost null subcarrier 455 of the fifth frequency band 450 are omitted.

Meanwhile, the first frequency band 410 of FIG. 4 is a band corresponding to 1 null subcarrier 415 and two 1$^{st}$ type RUs (or one 2nd type RU), and the sizes of the first, second, fourth, and fifth frequency bands 410, 420, 440, and 450 are equal to one another.

As indicated in dotted likes in the drawing, in the example of FIG. 4, since each of the resource units is aligned along the frequency axis, in case resource units having different sizes are combined and allocated, this alignment will be advantageous for being dynamically allocated to multiple users. Additionally, as described above, by adequately inserting multiple leftover tones, the associated interference may be decreased.

Figure 5:
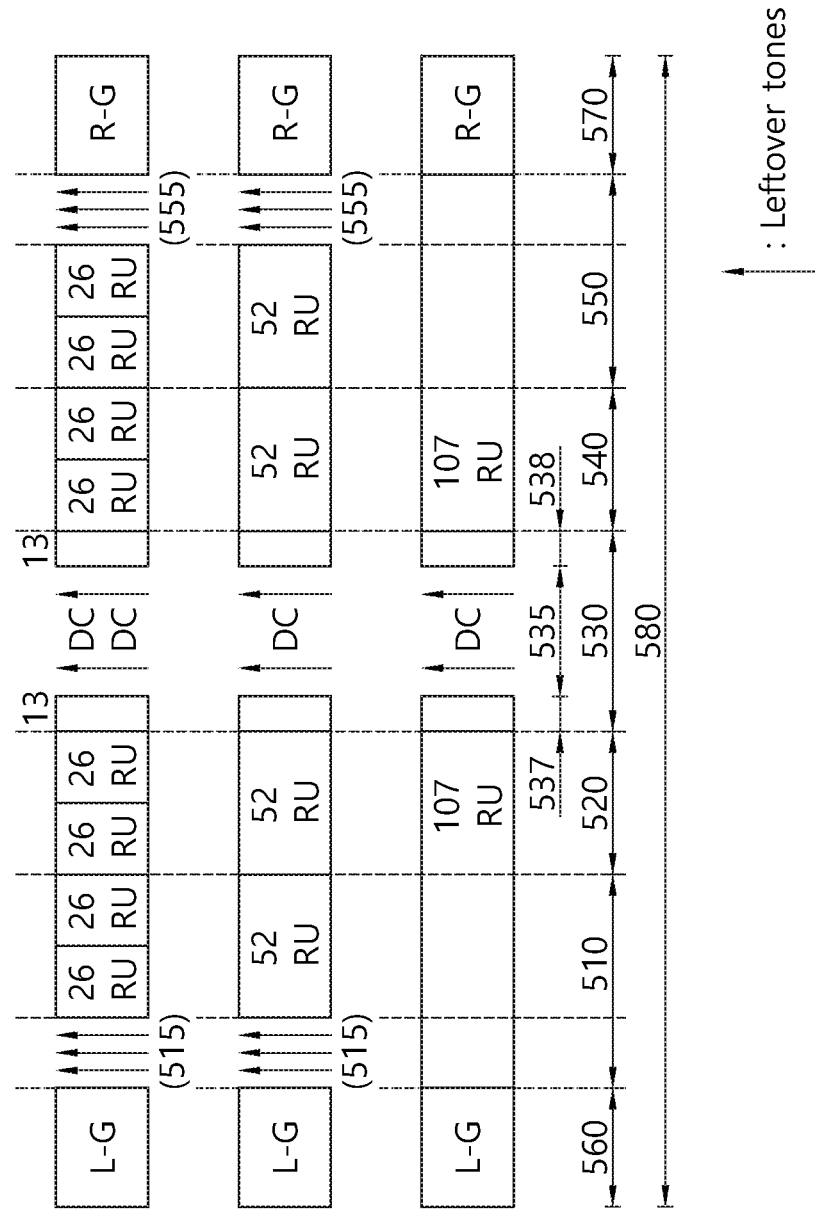
FIG. 5 is a drawing showing an exemplary method for allocating resource units and leftover tones in a 20 MHz bandwidth according to an additional example.

FIG. 5 is a drawing showing an exemplary method for allocating resource units and leftover tones in a 20 MHz bandwidth according to an additional example.

Since the main characteristics of FIG. 5 are identical to the main characteristics of FIG. 4, detailed description of the same will be omitted for simplicity. And, therefore, the following description will focus on the characteristics that are different from FIG. 4.

Although the example of FIG. 5 discloses an example of using 26-RU, 52-RU, and 107-RU, the size (i.e., the number of tones/subcarriers that are included) of each RU is variable. The 3 types RUs may be expressed as first to third resource units (RU).

Just as in the example of FIG. 4, a predetermined bandwidth 580 may correspond to 20 MHz. The predetermined bandwidth 580 includes first to fifth frequency bands 510, 520, 530, 540, and 550, which are contiguous with one another. Meanwhile, the first frequency band 510 is also contiguous with a left guard band 560, and the fifth frequency band 550 is also contiguous with the right guard band 570.

According to the example of FIG. 5, in case the 1$^{st}$ type RU (i.e., 26-RU) or the 2nd type RU (i.e., 52-RU) is included in the first frequency band 510, which is contiguous with the left guard band 560, it is preferable that the leftmost subcarrier 515 of the first frequency band 510 is configured of null subcarriers. It is preferable that the leftmost null subcarrier 515 that is being included in the example of FIG. 5 corresponds to 3 null subcarriers.

Conversely, in case the 3rd type RU (i.e., 107-RU) is allocated throughout the first frequency band 510 and the second frequency band 520, it is preferable that a null subcarrier is not included in the first and second frequency bands 510 and 520. Meanwhile, unlike in the example shown in FIG. 4, a null subcarrier is not included in the second frequency band 520 and the fourth frequency band 540 in any case.

Such characteristics of the first and second frequency bands 510 and 520 are identically applied to the rightmost null subcarriers being included in the fourth and fifth frequency bands 540 and 550.

In case of the third frequency band 530, although leftover tones are equally positioned near the DC tones (3 tones), and although the structure of each 26-RU is equally configured of 13 tones being non-contiguously positioned (or laid-out), the number of leftover tones near the DC tones may be decided to be equal to 2 tones.

Figure 6:
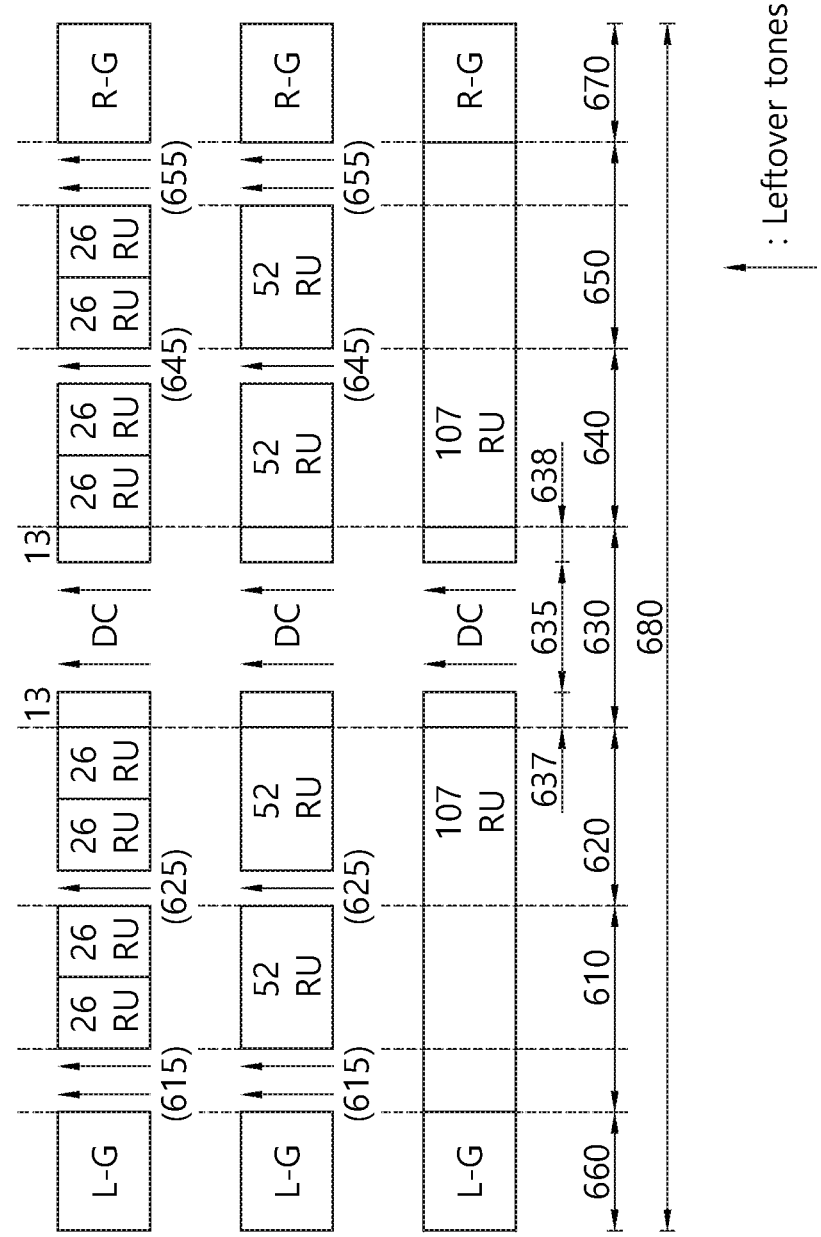
FIG. 6 is a drawing describing a modified example of the allocation of resource units and leftover tones in a 20 MHz bandwidth.

FIG. 6 is a drawing showing an exemplary method for allocating resource units and leftover tones in a 20 MHz bandwidth according to an additional example.

Since the main characteristics of FIG. 6 are identical to the main characteristics of FIG. 4, detailed description of the same will be omitted for simplicity. And, therefore, the following description will focus on the characteristics that are different from FIG. 4.

Although the example of FIG. 6 discloses an example of using 26-RU, 52-RU, and 107-RU, the size (i.e., the number of tones/subcarriers that are included) of each RU is variable. The 3 types RUs may be expressed as first to third resource units (RU).

Just as in the example of FIG. 4, a predetermined bandwidth 680 may correspond to 20 MHz. The predetermined bandwidth 680 includes first to fifth frequency bands 610, 620, 630, 640, and 650, which are contiguous with one another. Meanwhile, the first frequency band 610 is also contiguous with a left guard band 660, and the fifth frequency band 650 is also contiguous with the right guard band 670.

According to the example of FIG. 6, in case the 1st type RU (i.e., 26-RU) or the Type-2 resource unit (i.e., 52-RU) is included in the first frequency band 610, which is contiguous with the left guard band 660, it is preferable that the leftmost subcarrier 615 of the first frequency band 610 is configured of null subcarriers. It is preferable that the leftmost null subcarrier 615 that is being included in the example of FIG. 6 corresponds to 2 null subcarriers.

Conversely, in case the 3rd type RU (i.e., 107-RU) is allocated throughout the first frequency band 610 and the second frequency band 620, it is preferable that a null subcarrier is not included in the first and second frequency bands 610 and 620.

Meanwhile, if the 1st type RU (i.e., 26-RU) or the Type-2 resource unit (i.e., 52-RU) is allocated to the second frequency band 620, it is preferable that the leftmost subcarrier 625 of the second frequency band 620 is configured of null subcarriers, and, in this case, 1 null subcarrier may be included.

Such characteristics of the first and second frequency bands 610 and 620 are identically applied to the rightmost null subcarriers being included in the fourth and fifth frequency bands 640 and 650.

In case of the third frequency band 630, although leftover tones are equally positioned near the DC tones (3 tones), and although the structure of each 26-RU is equally configured of 13 tones being non-contiguously positioned (or laid-out), the number of leftover tones near the DC tones may be decided to be equal to 2 tones.

Figure 7:
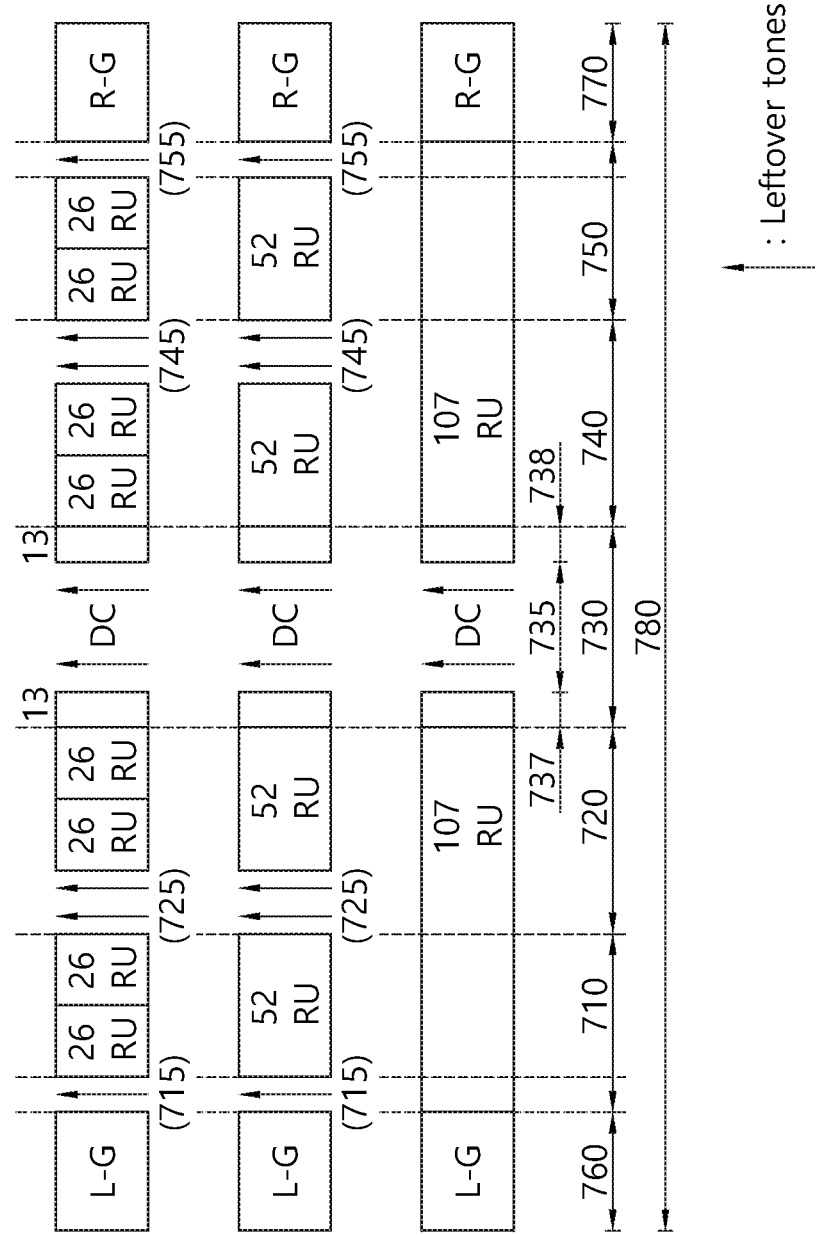
FIG. 7 is a drawing describing a modified example of the allocation of resource units and leftover tones in a 20 MHz bandwidth.

FIG. 7 is a drawing showing an exemplary method for allocating resource units and leftover tones in a 20 MHz bandwidth according to an additional example.

Since the main characteristics of FIG. 7 are identical to the main characteristics of FIG. 4, detailed description of the same will be omitted for simplicity. And, therefore, the following description will focus on the characteristics that are different from FIG. 4.

Although the example of FIG. 7 discloses an example of using 26-RU, 52-RU, and 107-RU, the size (i.e., the number of tones/subcarriers that are included) of each RU is variable. The 3 types RUs may be expressed as first to third resource units (RU).

Just as in the example of FIG. 4, a predetermined bandwidth 780 may correspond to 20 MHz. The predetermined bandwidth 780 includes first to fifth frequency bands 710, 720, 730, 740, and 750, which are contiguous with one another. Meanwhile, the first frequency band 710 is also contiguous with a left guard band 760, and the fifth frequency band 750 is also contiguous with the right guard band 770.

According to the example of FIG. 7, in case the 1st type RU (i.e., 26-RU) or the Type-2 resource unit (i.e., 52-RU) is included in the first frequency band 710, it is preferable that the leftmost subcarrier 715 of the first frequency band 710 is configured of null subcarriers. It is preferable that the leftmost null subcarrier 715 that is being included in the example of FIG. 7 corresponds to 1 null subcarrier.

Conversely, in case the 3rd type RU (i.e., 107-RU) is allocated throughout the first frequency band 710 and the second frequency band 720, it is preferable that a null subcarrier is not included in the first and second frequency bands 710 and 720.

Meanwhile, if the 1st type RU (i.e., 26-RU) or the Type-2 resource unit (i.e., 52-RU) is allocated to the second frequency band 720, it is preferable that the leftmost subcarrier 725 of the second frequency band 720 is configured of null subcarriers, and, in this case, 2 null subcarriers may be included.

Such characteristics of the first and second frequency bands 710 and 720 are identically applied to the rightmost null subcarriers being included in the fourth and fifth frequency bands 740 and 750.

In case of the third frequency band 730, although leftover tones are equally positioned near the DC tones (3 tones), and although the structure of each 26-RU is equally configured of 13 tones being non-contiguously positioned (or laid-out), the number of leftover tones near the DC tones may be decided to be equal to 2 tones.

Figure 8:
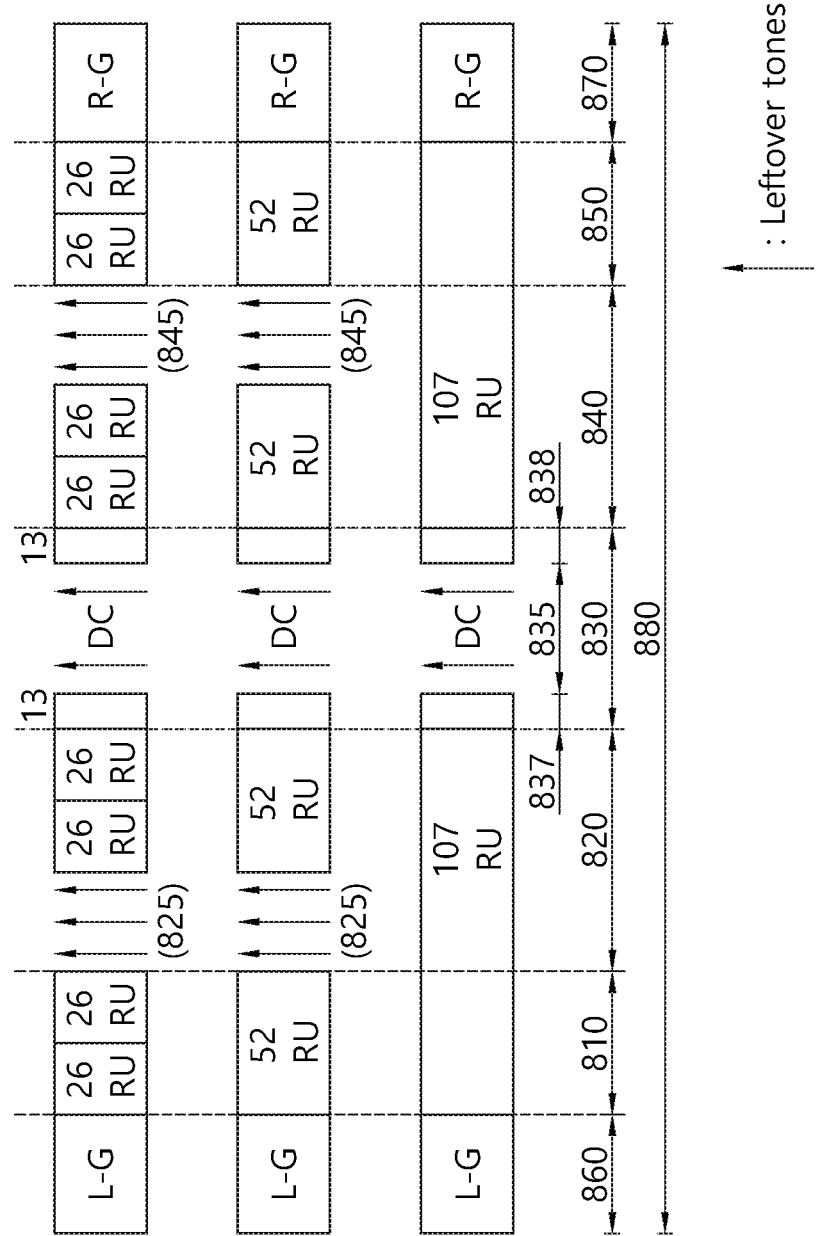
FIG. 8 is a drawing describing a modified example of the allocation of resource units and leftover tones in a 20 MHz bandwidth.

FIG. 8 is a drawing showing an exemplary method for allocating resource units and leftover tones in a 20 MHz bandwidth according to an additional example.

Since the main characteristics of FIG. 8 are identical to the main characteristics of FIG. 4, detailed description of the same will be omitted for simplicity. And, therefore, the following description will focus on the characteristics that are different from FIG. 4.

Although the example of FIG. 8 discloses an example of using 26-RU, 52-RU, and 107-RU, the size (i.e., the number of tones/subcarriers that are included) of each RU is variable. The 3 types RUs may be expressed as first to third resource units (RU).

Just as in the example of FIG. 4, a predetermined bandwidth 880 may correspond to 20 MHz. The predetermined bandwidth 880 includes first to fifth frequency bands 810, 820, 830, 840, and 850, which are contiguous with one another. Meanwhile, the first frequency band 810 is also contiguous with a left guard band 860, and the fifth frequency band 850 is also contiguous with the right guard band 870.

According to the example of FIG. 7, null subcarriers may not be included in the first frequency band 810.

Meanwhile, if the 1st type RU (i.e., 26-RU) or the Type-2 resource unit (i.e., 52-RU) is allocated to the second frequency band 820, it is preferable that the leftmost subcarrier 825 of the second frequency band 820 is configured of null subcarriers, and, in this case, 3 null subcarriers may be included.

Such characteristics of the first and second frequency bands 810 and 820 are identically applied to the rightmost null subcarriers being included in the fourth and fifth frequency bands 840 and 850.

In case of the third frequency band 830, although leftover tones are equally positioned near the DC tones (3 tones), and although the structure of each 26-RU is equally configured of 13 tones being non-contiguously positioned (or laid-out), the number of leftover tones near the DC tones may be decided to be equal to 2 tones.

Figure 9:
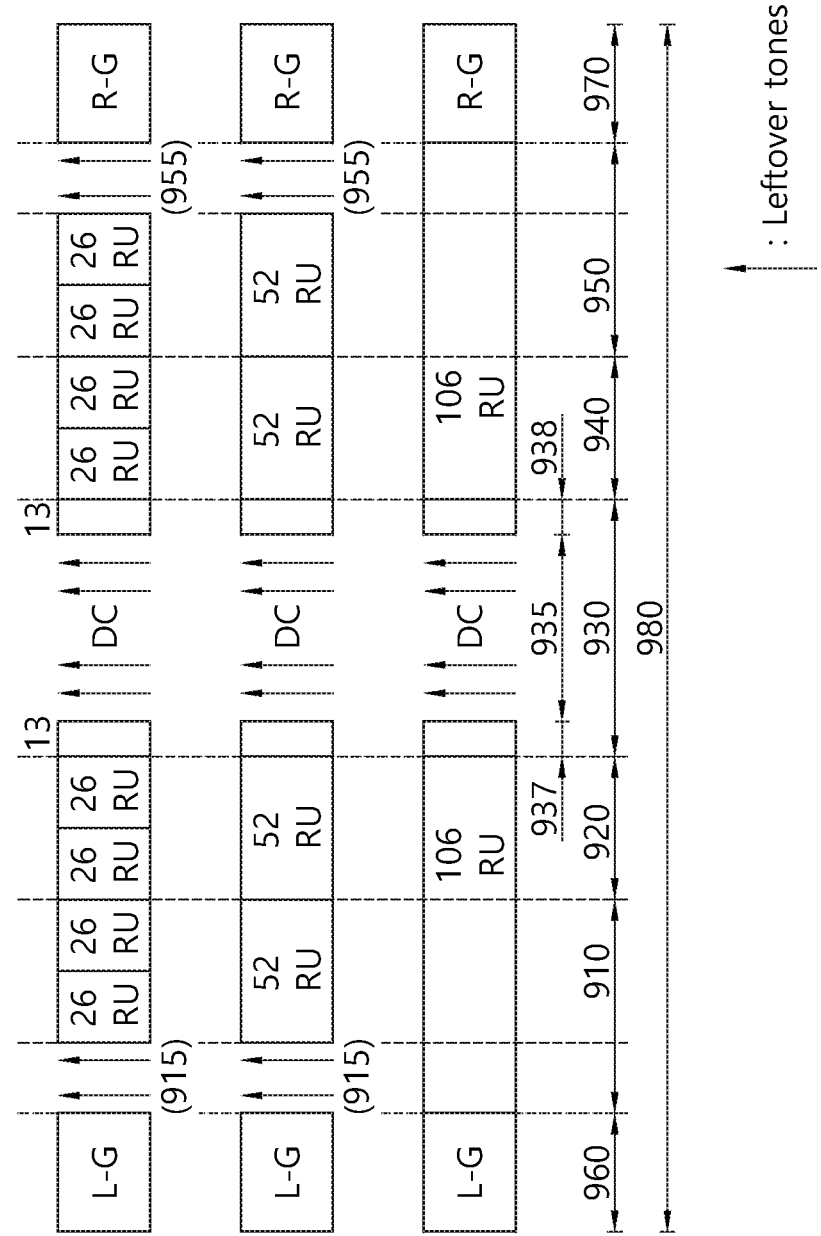
FIG. 9 is a drawing describing a modified example of the allocation of resource units and leftover tones in a 20 MHz bandwidth.

FIG. 9 is a drawing showing an exemplary method for allocating resource units and leftover tones in a 20 MHz bandwidth according to an additional example.

Since the main characteristics of FIG. 9 are identical to the main characteristics of FIG. 4, detailed description of the same will be omitted for simplicity. And, therefore, the following description will focus on the characteristics that are different from FIG. 4.

Although the example of FIG. 9 discloses an example of using 26-RU, 52-RU, and 106-RU, the size (i.e., the number of tones/subcarriers that are included) of each RU is variable. The 3 types RUs may be expressed as first to third resource units (RU).

Just as in the example of FIG. 4, a predetermined bandwidth 980 may correspond to 20 MHz. The predetermined bandwidth 980 includes first to fifth frequency bands 910, 920, 930, 940, and 950, which are contiguous with one another. Meanwhile, the first frequency band 910 is also contiguous with a left guard band 960, and the fifth frequency band 950 is also contiguous with the right guard band 970.

Meanwhile, if the 1st type RU (i.e., 26-RU) or the Type-2 resource unit (i.e., 52-RU) is allocated to the first frequency band 910, it is preferable that the leftmost subcarrier 915 of the first frequency band 910 is configured of null subcarriers, and, in this case, 2 null subcarriers may be included.

According to the example of FIG. 9, null subcarriers may not be included in the second frequency band 920.

Such characteristics of the first and second frequency bands 910 and 920 are identically applied to the rightmost null subcarriers being included in the fourth and fifth frequency bands 940 and 950.

In case of the third frequency band 930, although leftover tones are equally positioned near the DC tones (3 tones), and although the structure of each 26-RU is equally configured of 13 tones being non-contiguously positioned (or laid-out), the number of leftover tones near the DC tones may be decided to be equal to 4 tones.

Figure 10:
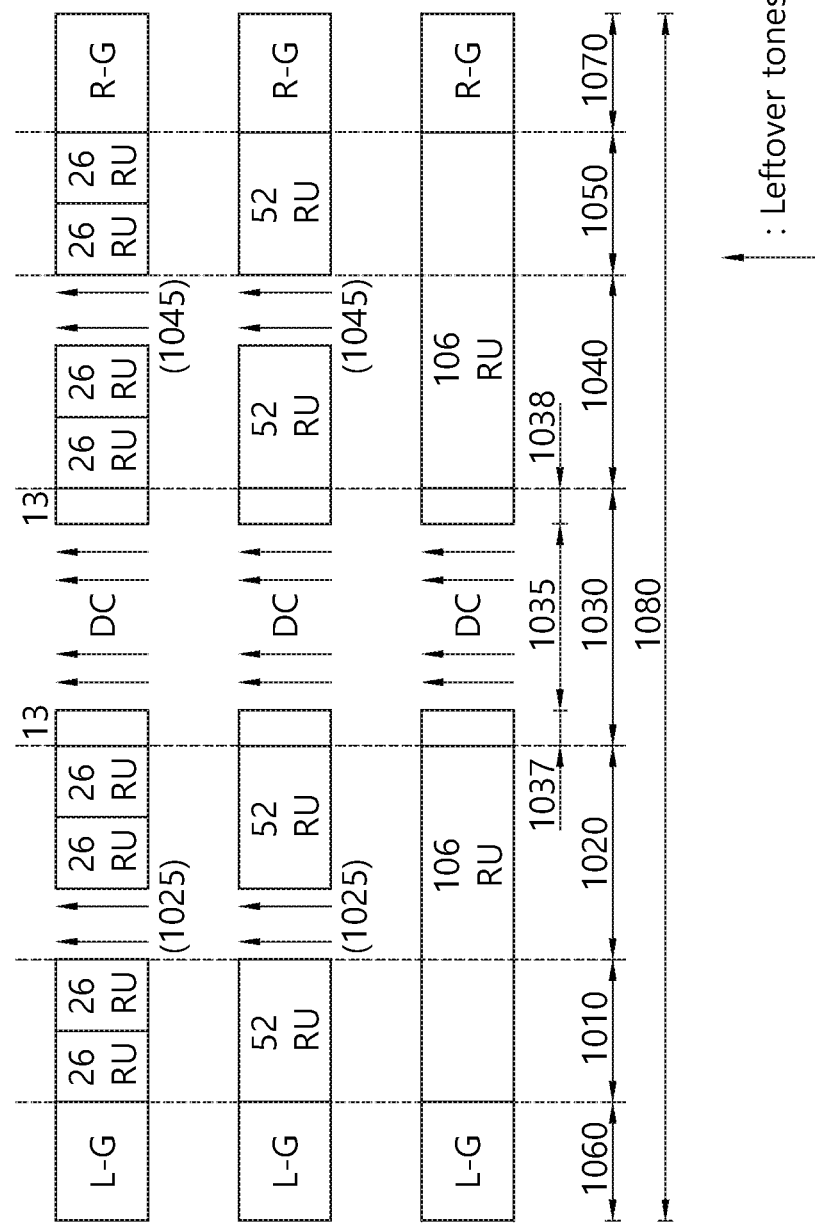
FIG. 10 is a drawing describing a modified example of the allocation of resource units and leftover tones in a 20 MHz bandwidth.

FIG. 10 is a drawing showing an exemplary method for allocating resource units and leftover tones in a 20 MHz bandwidth according to an additional example.

Since the main characteristics of FIG. 10 are identical to the main characteristics of FIG. 4, detailed description of the same will be omitted for simplicity. And, therefore, the following description will focus on the characteristics that are different from FIG. 4.

Although the example of FIG. 10 discloses an example of using 26-RU, 52-RU, and 106-RU, the size (i.e., the number of tones/subcarriers that are included) of each RU is variable. The 3 types RUs may be expressed as first to third resource units (RU).

Just as in the example of FIG. 4, a predetermined bandwidth 1080 may correspond to 20 MHz. The predetermined bandwidth 1080 includes first to fifth frequency bands 1010, 1020, 1030, 1040, and 1050, which are contiguous with one another. Meanwhile, the first frequency band 1010 is also contiguous with a left guard band 1060, and the fifth frequency band 1050 is also contiguous with the right guard band 1070.

According to the example of FIG. 10, null subcarriers may not be included in the first frequency band 1010. Meanwhile, if the 1st type RU (i.e., 26-RU) or the $2^{nd}$ type RU (i.e., 52-RU) is allocated to the second frequency band 1020, it is preferable that the leftmost subcarrier 1025 of the second frequency band 1020 is configured of null subcarriers, and, in this case, 2 null subcarriers may be included.

Such characteristics of the first and second frequency bands 1010 and 1020 are identically applied to the rightmost null subcarriers being included in the fourth and fifth frequency bands 1040 and 1050.

In case of the third frequency band 1030, although leftover tones are equally positioned near the DC tones (3 tones), and although the structure of each 26-RU is equally configured of 13 tones being non-contiguously positioned (or laid-out), the number of leftover tones near the DC tones may be decided to be equal to 4 tones.

Figure 11:
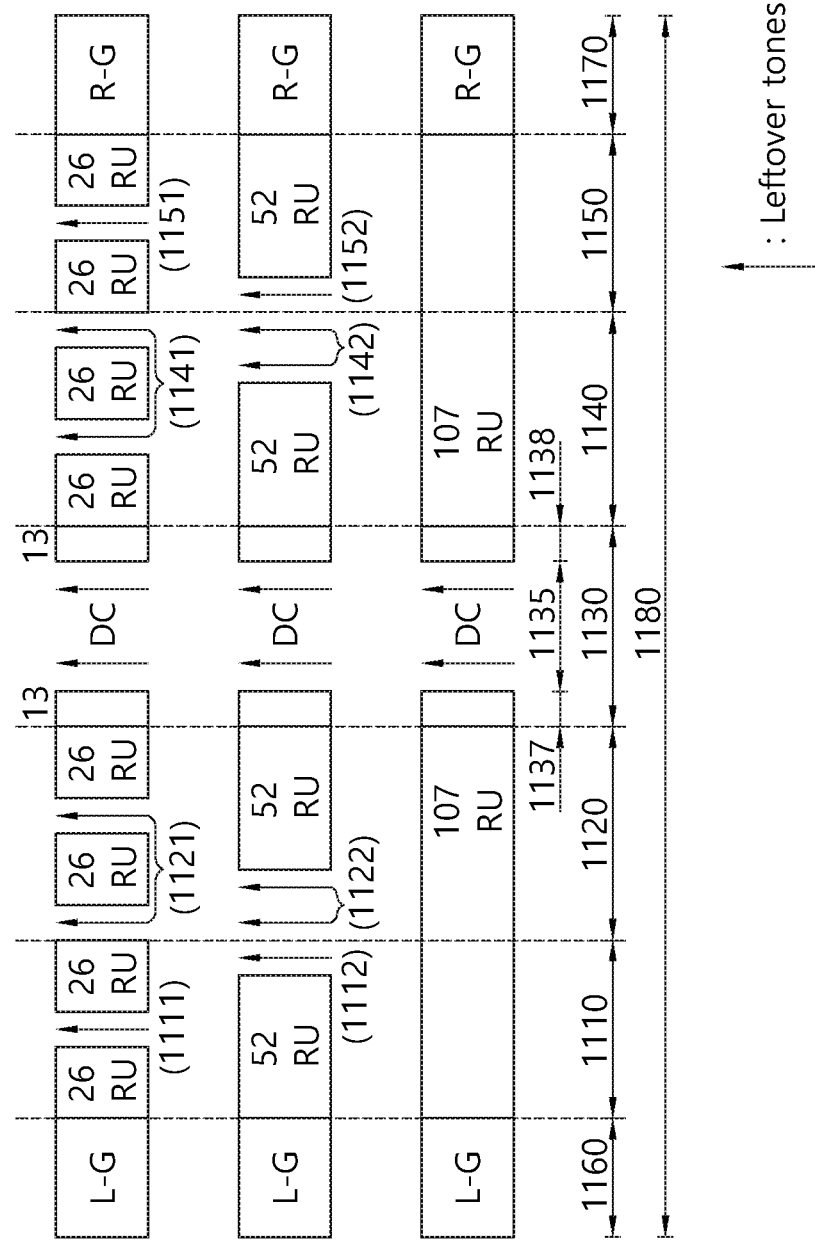
FIG. 11 is a drawing describing a modified example of the allocation of resource units and leftover tones in a 20 MHz bandwidth.

FIG. 11 is a drawing showing an exemplary method for allocating resource units and leftover tones in a 20 MHz bandwidth according to an additional example.

Since the main characteristics of FIG. 11 are identical to the main characteristics of FIG. 4, detailed description of the same will be omitted for simplicity. And, therefore, the following description will focus on the characteristics that are different from FIG. 4.

Although the example of FIG. 11 discloses an example of using 26-RU, 52-RU, and 107-RU, the size (i.e., the number of tones/subcarriers that are included) of each RU is variable. The 3 types RUs may be expressed as first to third resource units (RU).

Just as in the example of FIG. 4, a predetermined bandwidth 1180 may correspond to 20 MHz. The predetermined bandwidth 1180 includes first to fifth frequency bands 1110, 1120, 1130, 1140, and 1150, which are contiguous with one another. Meanwhile, the first frequency band 1110 is also contiguous with a left guard band 1160, and the fifth frequency band 1150 is also contiguous with the right guard band 1170.

According to the example of FIG. 11, in case the 1st type RU (i.e., 26-RU) is allocated to the first frequency band 1110, as shown in the drawing, 1 null subcarrier 1111 may be allocated between 2 26-RUs. Additionally, in case the Type-2 resource unit (i.e., 52-RU) is allocated to the first frequency band 1110, as shown in the drawing, 1 null subcarrier 1112 may be allocated to the rightmost subcarrier.

Additionally, in case the 1st type RU (i.e., 26-RU) is allocated to the second frequency band 1120, as shown in the drawing, 1 null subcarrier 1121 may be allocated to the left side of each of the 26-RUs. Additionally, in case the Type-2 resource unit (i.e., 52-RU) is allocated to the second frequency band 1120, as shown in the drawing, 2 null subcarriers 1122 may be allocated to the leftmost subcarrier.

Such characteristics of the first and second frequency bands 1110 and 1120 are identically applied to the null subcarriers 1141, 1142, 1151, and 1152 being included in the fourth and fifth frequency bands 1140 and 1150.

In case of the third frequency band 1130, although leftover tones are equally positioned near the DC tones (3 tones), and although the structure of each 26-RU is equally configured of 13 tones being non-contiguously positioned (or laid-out), the number of leftover tones near the DC tones may be decided to be equal to 2 tones.

Figure 12:
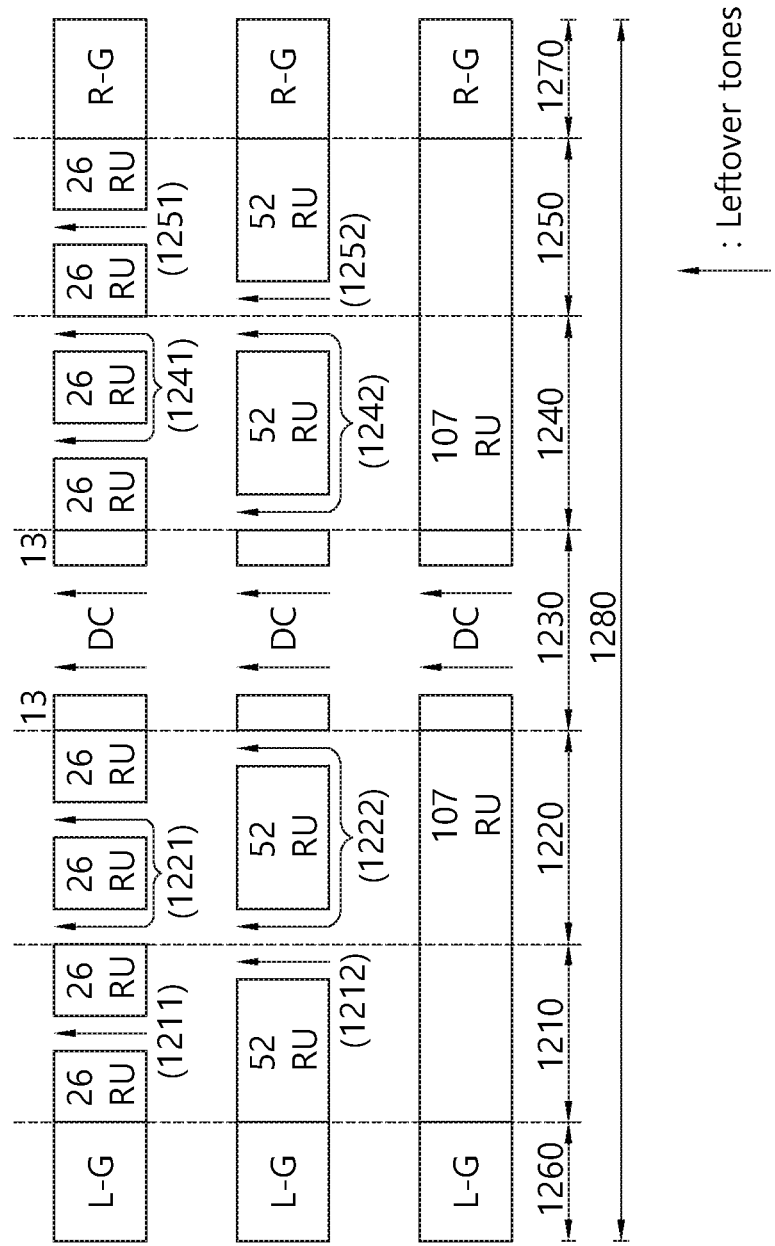
FIG. 12 is a drawing describing a modified example of the allocation of resource units and leftover tones in a 20 MHz bandwidth.

FIG. 12 is a drawing showing an exemplary method for allocating resource units and leftover tones in a 20 MHz bandwidth according to an additional example.

Since the main characteristics of FIG. 12 are identical to the main characteristics of FIG. 4, detailed description of the same will be omitted for simplicity. And, therefore, the following description will focus on the characteristics that are different from FIG. 4.

Although the example of FIG. 12 discloses an example of using 26-RU, 52-RU, and 107-RU, the size (i.e., the number of tones/subcarriers that are included) of each RU is variable. The 3 types RUs may be expressed as first to third resource units (RU).

Just as in the example of FIG. 4, a predetermined bandwidth 1280 may correspond to 20 MHz. The predetermined bandwidth 1280 includes first to fifth frequency bands 1210, 1220, 1230, 1240, and 1250, which are contiguous with one another. Meanwhile, the first frequency band 1210 is also contiguous with a left guard band 1260, and the fifth frequency band 1250 is also contiguous with the right guard band 1270.

According to the example of FIG. 12, in case the 1st type RU (i.e., 26-RU) is allocated to the first frequency band 1210, as shown in the drawing, 1 null subcarrier 1211 may be allocated between 2 26-RUs. Additionally, in case the Type-2 resource unit (i.e., 52-RU) is allocated to the first frequency band 1210, as shown in the drawing, 1 null subcarrier 1212 may be allocated to the rightmost subcarrier.

Additionally, in case the 1st type RU (i.e., 26-RU) is allocated to the second frequency band 1220, as shown in the drawing, 1 null subcarrier 1221 may be allocated to the left side of each of the 26-RUs. Additionally, in case the Type-2 resource unit (i.e., 52-RU) is allocated to the second frequency band 1220, as shown in the drawing, null subcarriers 1222 may be allocated to both ends of the subcarrier.

Such characteristics of the first and second frequency bands 1210 and 1220 are identically applied to the null subcarriers 1241, 1242, 1251, and 1252 being included in the fourth and fifth frequency bands 1240 and 1250.

In case of the third frequency band 1230, although leftover tones are equally positioned near the DC tones (3 tones), and although the structure of each 26-RU is equally configured of 13 tones being non-contiguously positioned (or laid-out), the number of leftover tones near the DC tones may be decided to be equal to 2 tones.

Figure 13:
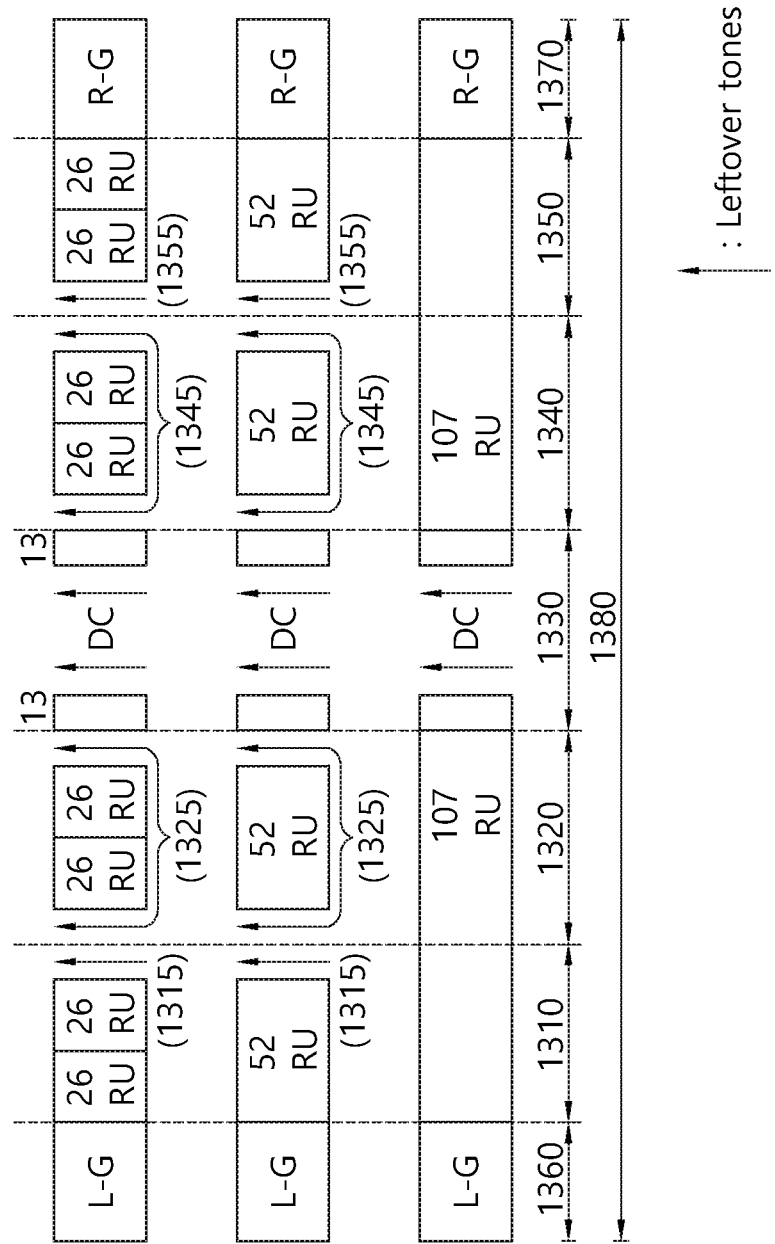
FIG. 13 is a drawing describing a modified example of the allocation of resource units and leftover tones in a 20 MHz bandwidth.

FIG. 13 is a drawing showing an exemplary method for allocating resource units and leftover tones in a 20 MHz bandwidth according to an additional example.

Since the main characteristics of FIG. 13 are identical to the main characteristics of FIG. 4, detailed description of the same will be omitted for simplicity. And, therefore, the following description will focus on the characteristics that are different from FIG. 4.

Although the example of FIG. 13 discloses an example of using 26-RU, 52-RU, and 107-RU, the size (i.e., the number of tones/subcarriers that are included) of each RU is variable. The 3 types RUs may be expressed as first to third resource units (RU).

Just as in the example of FIG. 4, a predetermined bandwidth 1380 may correspond to 20 MHz. The predetermined bandwidth 1380 includes first to fifth frequency bands 1310, 1320, 1330, 1340, and 1350, which are contiguous with one another. Meanwhile, the first frequency band 1310 is also contiguous with a left guard band 1360, and the fifth frequency band 1350 is also contiguous with the right guard band 1370.

According to the example of FIG. 13, only in a case when the Type-1 or Type-2 resource unit (RU) is included in the first frequency band 1310, 1 null subcarrier 1315 may be allocated to the rightmost subcarrier. Additionally, only in a case when the Type-1 or Type-2 resource unit (RU) is included in the second frequency band 1320, 1 null subcarrier 1325 may be allocated to each of the leftmost subcarrier and the rightmost subcarrier.

Such characteristics of the first and second frequency bands 1310 and 1320 are identically applied to the null subcarriers 1345 and 1355 being included in the fourth and fifth frequency bands 1340 and 1350.

In case of the third frequency band 1330, although leftover tones are equally positioned near the DC tones (3 tones), and although the structure of each 26-RU is equally configured of 13 tones being non-contiguously positioned (or laid-out), the number of leftover tones near the DC tones may be decided to be equal to 2 tones.

Figure 14:
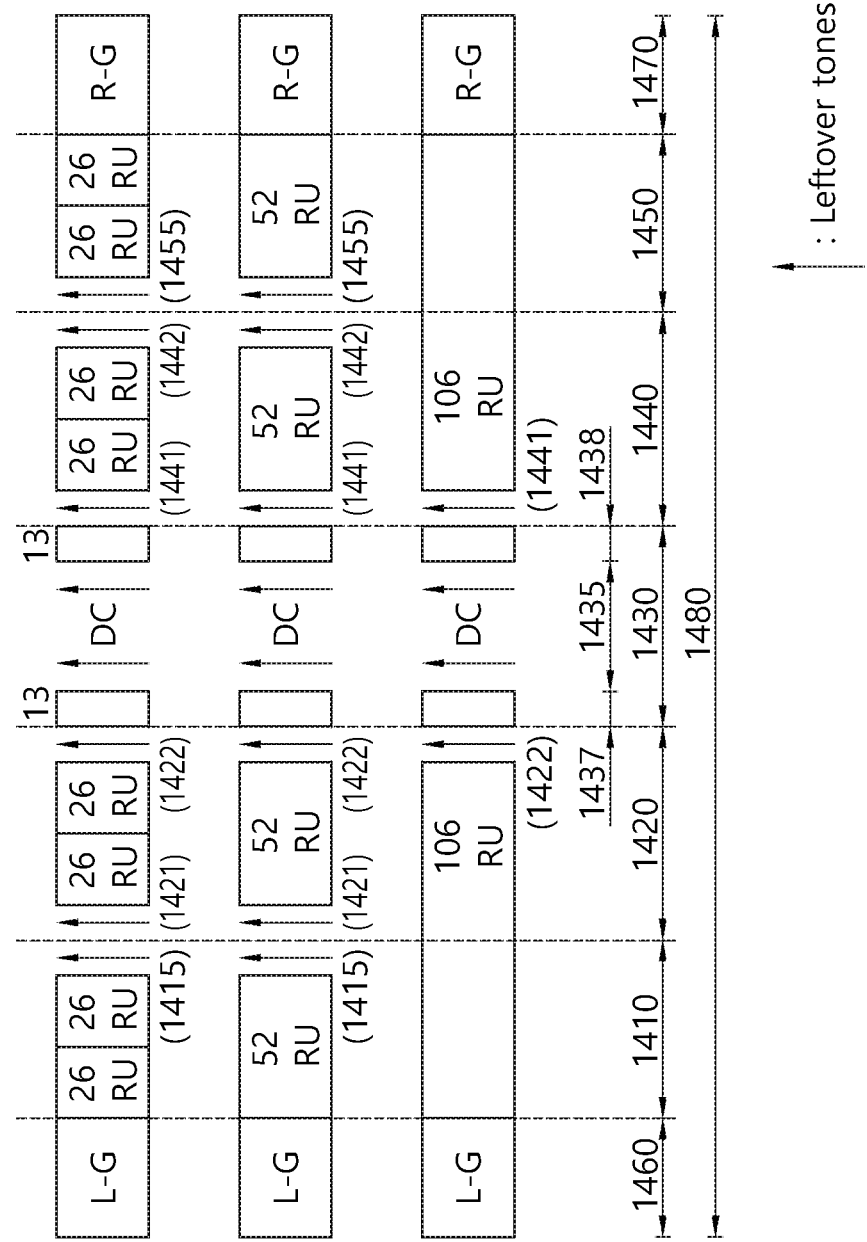
FIG. 14 is a drawing describing a modified example of the allocation of resource units and leftover tones in a 20 MHz bandwidth.

FIG. 14 is a drawing showing an exemplary method for allocating resource units and leftover tones in a 20 MHz bandwidth according to an additional example.

Since the main characteristics of FIG. 14 are identical to the main characteristics of FIG. 4, detailed description of the same will be omitted for simplicity. And, therefore, the following description will focus on the characteristics that are different from FIG. 4.

Although the example of FIG. 14 discloses an example of using 26-RU, 52-RU, and 106-RU, the size (i.e., the number of tones/subcarriers that are included) of each RU is variable. The 3 types RUs may be expressed as first to third resource units (RU).

Just as in the example of FIG. 4, a predetermined bandwidth 1480 may correspond to 20 MHz. The predetermined bandwidth 1480 includes first to fifth frequency bands 1410, 1420, 1430, 1440, and 1450, which are contiguous with one another. Meanwhile, the first frequency band 1410 is also contiguous with a left guard band 1460, and the fifth frequency band 1450 is also contiguous with the right guard band 1470.

According to the example of FIG. 14, only in a case when the Type-1 or Type-2 resource unit (RU) is included in the first frequency band 1410, 1 null subcarrier 1415 may be allocated to the rightmost subcarrier. Additionally, only in a case when the Type-1 or Type-2 resource unit (RU) is included in the second frequency band 1420, 1 null subcarrier 1421 may be allocated to the leftmost subcarrier, and 1 null subcarrier 1422 may be allocated to the rightmost subcarrier. If a Type 3 resource unit (i.e., 106-RU) is included in a band including the first frequency band 1410 and the second frequency band 1420, 1 null subcarrier 1422 may be allocated to the rightmost subcarrier.

Such characteristics of the first and second frequency bands 1410 and 1420 are identically applied to the null subcarriers being included in the fourth and fifth frequency bands 1440 and 1450.

In case of the third frequency band 1430, although leftover tones are equally positioned near the DC tones (3 tones), and although the structure of each 26-RU is equally configured of 13 tones being non-contiguously positioned (or laid-out), the number of leftover tones near the DC tones may be decided to be equal to 2 tones.

Figure 15:
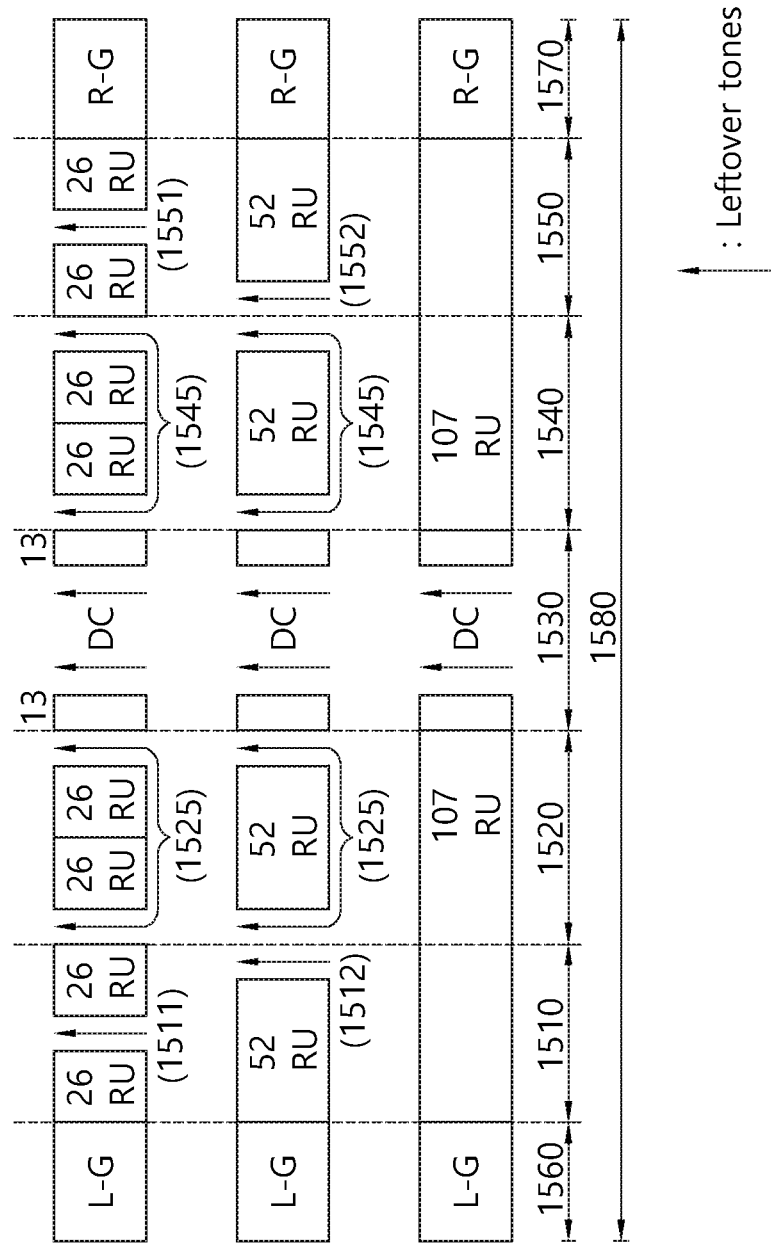
FIG. 15 is a drawing describing a modified example of the allocation of resource units and leftover tones in a 20 MHz bandwidth.

FIG. 15 is a drawing showing an exemplary method for allocating resource units and leftover tones in a 20 MHz bandwidth according to an additional example.

Since the main characteristics of FIG. 15 are identical to the main characteristics of FIG. 4, detailed description of the same will be omitted for simplicity. And, therefore, the following description will focus on the characteristics that are different from FIG. 4.

Although the example of FIG. 15 discloses an example of using 26-RU, 52-RU, and 107-RU, the size (i.e., the number of tones/subcarriers that are included) of each RU is variable. The 3 types RUs may be expressed as first to third resource units (RU).

Just as in the example of FIG. 4, a predetermined bandwidth 1580 may correspond to 20 MHz. The predetermined bandwidth 1580 includes first to fifth frequency bands 1510, 1520, 1530, 1540, and 1550, which are contiguous with one another.

According to the example of FIG. 15, only in a case when the Type-1 or Type-2 resource unit (RU) is included in the first frequency band 1510, 1 null subcarrier 1511 and 1512 is included in the illustrated position. Additionally, only in a case when the Type-1 or Type-2 resource unit (RU) is included in the second frequency band 1520, a null subcarrier 1525 is included as shown in the drawing.

Such characteristics of the first and second frequency bands 1510 and 1520 are identically applied to the null subcarriers being included in the fourth and fifth frequency bands 1540 and 1550. Meanwhile, in case of the third frequency band 1530, the structure corresponds to the structure of the third frequency 530 of FIG. 5.

Figure 16:
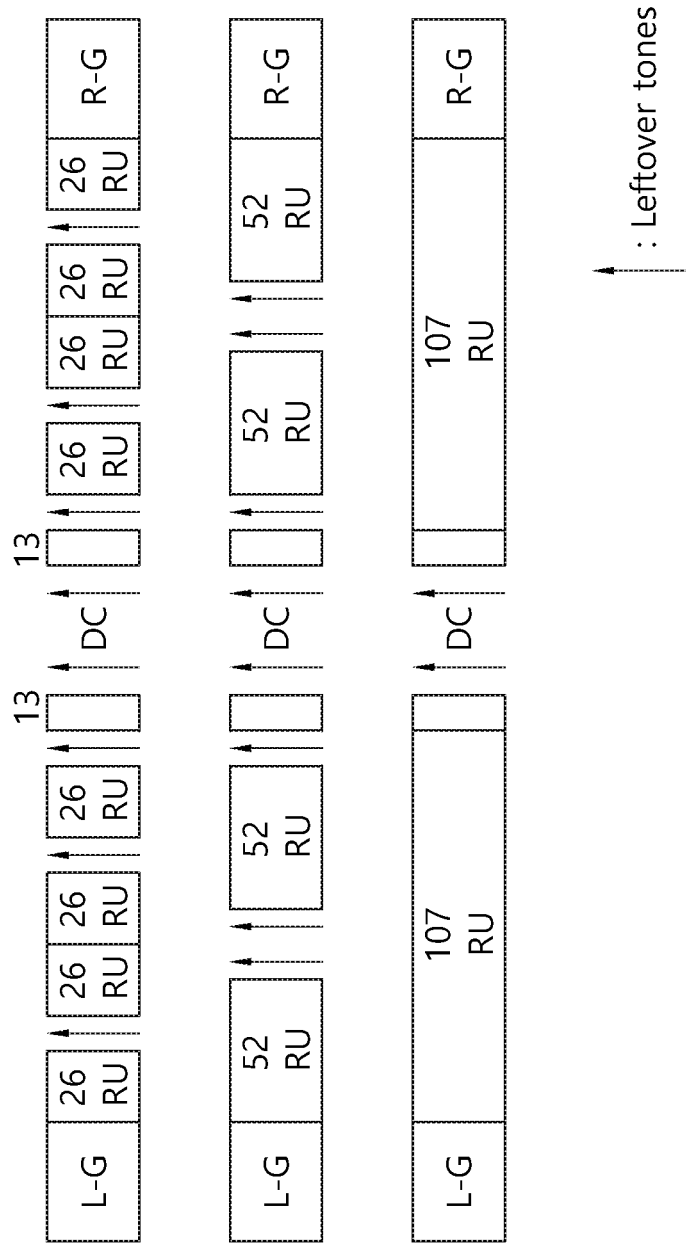
FIG. 16 is a drawing describing a modified example of the allocation of resource units and leftover tones in a 20 MHz bandwidth.
Figure 17:
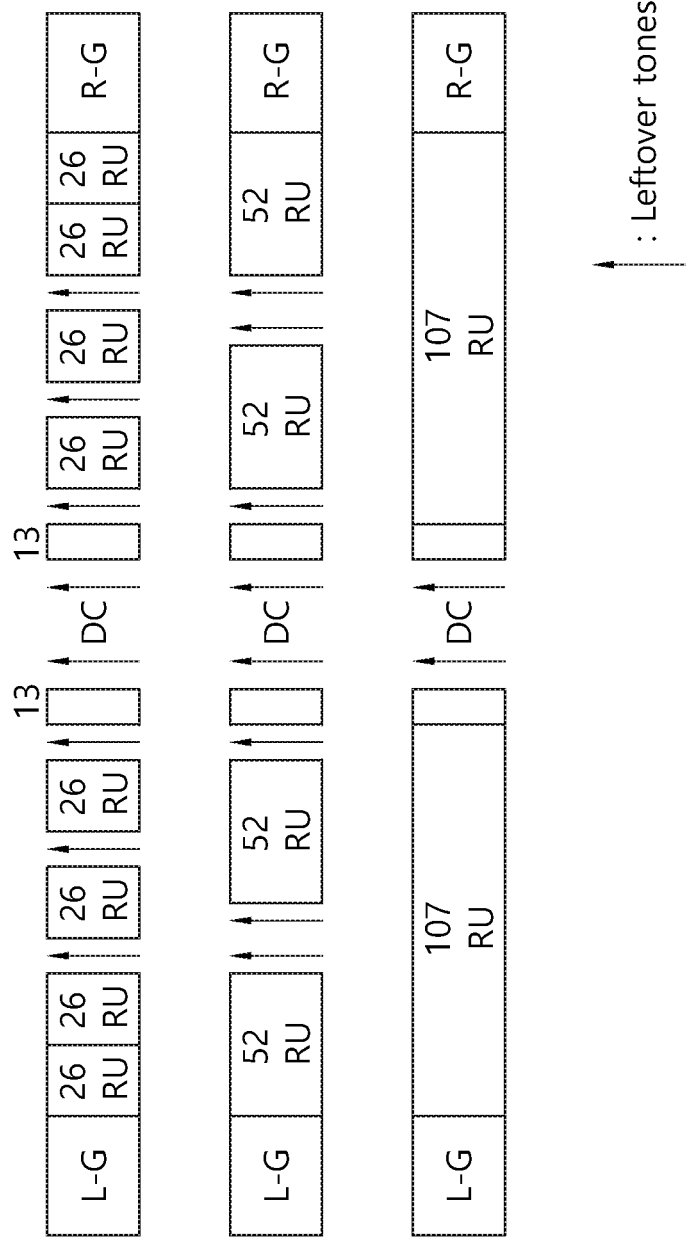
FIG. 17 is a drawing describing a modified example of the allocation of resource units and leftover tones in a 20 MHz bandwidth.

FIG. 16 and FIG. 17 are drawings respectively showing exemplary methods for allocating resource units and leftover tones in a 20 MHz bandwidth according to an additional example.

In comparison with the example of FIG. 15, the position of the null subcarrier between the 26-RUs is different, and the rest of the characteristics are all the same. Similarly, in comparison with the example of FIG. 15 or the example of FIG. 16, the position of the null subcarrier between the 26-RUs is different, and the rest of the characteristics are all the same.

Figure 18:
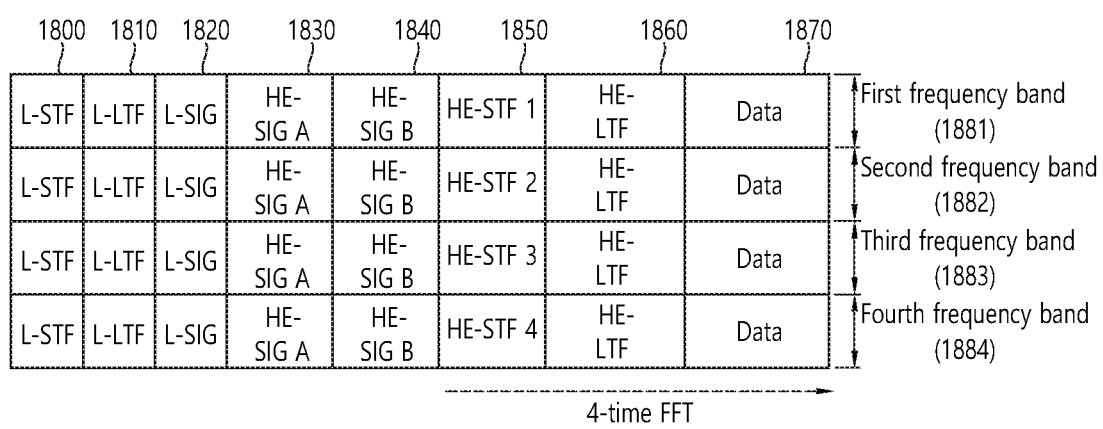
FIG. 18 is a block diagram showing a DL/UL PPDU format that can be used in the exemplary embodiment.

FIG. 18 is a block diagram showing a DL/UL PPDU format that can be used in the exemplary embodiment.

In FIG. 18, a PPDU format that is being transmitted based on an OFDMA for an AP or non-AP STA according to the exemplary embodiment is disclosed.

Referring to FIG. 18, a PPDU header of a MU PPDU may include a legacy-short training field (L-STF), a legacy-long training field (L-LTF), a legacy-signal (L-SIG), a high efficiency-signal A (HE-SIG A), a high efficiency-signal B (HE-SIG B), a high efficiency-short training field (HE-STF), a high efficiency-long training field (HE-LTF), and a data field (or MAC payload). The PPDU may be divided into a legacy part, which consists of a part starting from the PHY header to the L-SIG, and a high efficiency (HE) part (HE part), which consists of a part after the L-SIG.

The L-STF 1800 may include a short training orthogonal frequency division multiplexing symbol (short training OFDM symbol). The L-STF 1800 may be used for frame detection, automatic gain control (AGC), diversity detection, and coarse frequency/time synchronization.

The L-LTF 1810 may include a long training orthogonal frequency division multiplexing symbol (long training OFDM symbol). The L-LTF 1810 may be used for fine frequency/time synchronization and channel prediction.

The L-SIG 1820 may be used for transmitting control information. The L-SIG 1820 may include information on data transmission rate, data length, and so on. Additionally, the L-SIG 1820 may be repeated and then transmitted. More specifically, the L-SIG 1820 may be configured of a repetitive format (e.g., this may be referred to as R-LSIG).

The HE-SIG A 1830 may include information for indicating the STA that is intended to receive the DL MU PPDU. For example, the HE-SIG A 1830 may include an identifier of a specific STA (or AP) that is to receive the PPDU, information for indicating the group of the STA. For example, in case the HE-SIG A 1830 is being used for the DL MU PPDU, resource allocation information for the reception of the DL MU PPDU of the non-AP STA may also be included.

Additionally, the HE-SIG A 1830 may also include color bits information for BSS identification information, bandwidth information, tail bit, CRC bit, modulation and coding scheme (MCS) information on the HE-SIG B 1840, information on the number of symbols for the HE-SIG B 1840, and cyclic prefix (CP) (or guard interval (GI)) length information.

The HE-SIG B 1840 may include information on a length MCS of a Physical layer service data unit (PSDU) and tail bit, and so on. Additionally, the HE-SIG B 1840 may also include information on an STA that is to receive the PPDU, OFDMA based resource allocation information (or MU-MIMO information). In case the OFDMA based resource allocation information (or MU-MIMO related information) is included in the HE-SIG B 1840, the resource allocation information may not be included in the HE-SIG A 1830.

The HE-SIG A 1830 or the HE-SIG B 1840 may include resource allocation information (or virtual resource allocation information) on at least one receiving STA.

As shown in the drawing, the previous field of the HE-SIG B 1840 within the MU PPDU may be transmitted in a duplicated format. In case of the HE-SIG B 1840, the HE-SIG B 1840 that is transmitted from part of the frequency band (e.g., a fourth frequency) may also include control information for a data field of the corresponding frequency band (i.e., the fourth frequency band) and for a data field of another frequency band (e.g., the second frequency band) other than the corresponding frequency band. Additionally, the HE-SIG B 1840 of a specific frequency band (e.g., the second frequency band) may correspond to a duplicated format of the HE-SIG B 1840 of another frequency band (e.g., the fourth frequency band). Alternatively, the HE-SIG B 1840 may be transmitted in an encoded format within the entire transmission resource. The field following (or after) the HE-SIG B 1840 may include individual information for each of the receiving STAs receiving the PPDU.

The HE-STF 1840 may be used for enhancing automatic gain control estimation in a multiple input multiple output (MIMO) environment or an OFDMA environment.

The HE-LTF 1850 may be used for estimating a channel in a MIMO environment or an OFDMA environment.

The size of the FFT/IFFT being applied to the HE-STF 1850 and the field after the HE-STF 1850 may be different from the size of the FFT/IFFT being applied to the field before the HE-STF 1850. For example, the size of the FFT/IFFT being applied to the HE-STF 1850 and the field after the HE-STF 1850 may be four times larger than the size of the FFT/IFFT being applied to the field before the HE-STF 1850.

In other words, if at least one field of the L-STF 1800, the L-LTF 1810, the L-SIG 1820, the HE-SIG A 1830, and the HE-SIG B 1840 is referred to as a control field, it may be expressed that Subcarrier frequency spacing that is applied to the control field is 4 times larger than the subcarrier frequency spacing that is applied to the data field 1870 (or HE-STF, HE-LTF fields). Alternatively, it may be said that an IDFT/DFT period that is applied to each symbol of the control field is 4 times shorter than an IDFT/DFT period that is applied to each data symbol of the data field. More specifically, the subcarrier frequency spacing being applied to the control field may be equal to 312.5 kHz, and the subcarrier frequency spacing being applied to each symbol of the data field 1870 (or HE-STF, HE-LTF fields) may be equal to 78.125 kHz, and the IDFT/DFT length being applied to the control field may be expressed as being equal to 3.2 μs, and the IDFT/DFT length being applied to the symbol of the data field 1870 (or HE-STF, HE-LTF fields) may be expressed as being equal to 12.8 μs.

The STA may receive the HE-SIG A 1830 and may receive an instruction to receive a downlink PPDU based on the HE-SIG A 1830. In this case, the STA may perform decoding based on the FFT size, which is changed starting from the HE-STF 1850 and the field after the HE-STF 1850. Conversely, if the STA fails to receive instruction to receive a downlink PPDU based on the HE-SIG A, the STA may stop the decoding process and may perform network allocation vector (NAV) configuration. A cyclic prefix (CP) of the HE-STF 1850 may have a size that is larger than the CP of other fields, and, during such CP period, the STA may change the FFT size and may perform decoding on the downlink PPDU.

The above-described examples of FIG. 4 to FIG. 17 may be applied to the HE-STF 1850, the HE-LTF 1860, and the data field 1870. For example, in case the example is applied to the data field 1870, each of the 4 data fields shown in the drawing may correspond to a 20 MHz band. More specifically, in case of allocating resource units (RUs) for each of the data fields 1870, according to the examples of FIG. 4 to FIG. 17, the resource units (RU) may be allocated and null subcarriers may be allocated.

Meanwhile, in the example of FIG. 18, an example of performing transmission through 4 frequency bands (i.e., 20 MHz*4=80 MHz) is disclosed, and not all of the 4 frequency bands 1881, 1882, 1883, and 1884 are required to be used, and, for example, only 1 frequency band may be used, or only 2 frequency bands may be optionally used.

Figure 19:
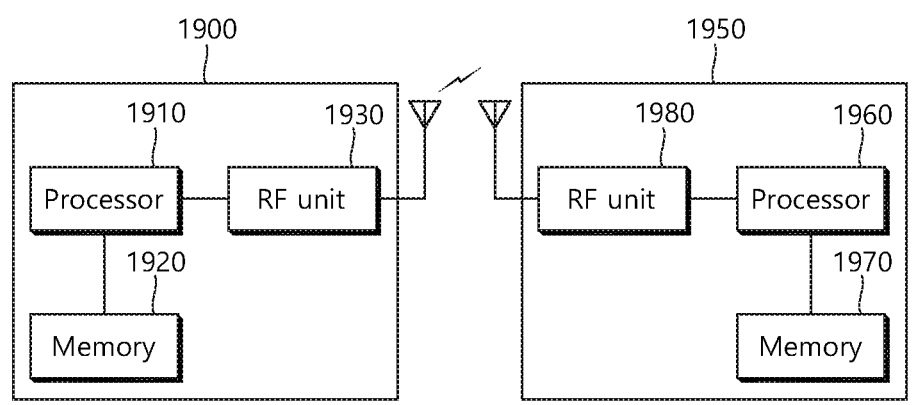
FIG. 19 is a block diagram showing a wireless device to which the exemplary embodiment.

FIG. 19 is a block diagram showing a wireless device to which the exemplary embodiment.

Referring to FIG. 19, as an STA that can realize the above-described exemplary embodiment, the wireless device may correspond to an AP 1900 or a non-AP station (non-AP STA).

The AP 1900 includes a processor 1910, a memory 1920, and a radio frequency unit (RF unit) 1930.

The RF unit 1930 is connected to the processor 1910, thereby being capable of transmitting and/or receiving radio signals.

The processor 1910 implements the functions, processes, and/or methods proposed in the present invention. For example, the processor 1910 may be realized to perform the operations of the wireless device according to the above-described exemplary embodiments of the present invention. The processor may perform the operations of the wireless device, which are disclosed in the exemplary embodiments of FIG. 1 to FIG. 18.

The non-AP STA 1950 includes a processor 1960, a memory 1970, and a radio frequency unit (RF unit) 1980.

The RF unit 1980 is connected to the processor 1960, thereby being capable of transmitting and/or receiving radio signals.

The processor 1960 implements the functions, processes, and/or methods proposed in the present invention. For example, the processor 1960 may be realized to perform the operations of the non-AP STA according to the above-described exemplary embodiments of the present invention. The processor may perform the operations of the non-AP STA, which are disclosed in the exemplary embodiments of FIG. 1 to FIG. 18.

For example, the processor 1960 may allocate RUs in accordance with the exemplary embodiments of FIG. 4 to FIG. 18 and may allocate the corresponding null subcarriers.

The processor 1910 and 1960 may include an application-specific integrated circuit (ASIC), another chip set, a logical circuit, a data processing device, and/or a converter converting a baseband signal and a radio signal to and from one another. The memory 1920 and 1970 may include a read-only memory (ROM), a random access memory (RAM), a flash memory, a memory card, a storage medium, and/or another storage device. The RF unit 1930 and 1980 may include one or more antennas transmitting and/or receiving radio signals.

When the exemplary embodiment is implemented as software, the above-described method may be implemented as a module (process, function, and so on) performing the above-described functions. The module may be stored in the memory 1920 and 1970 and may be executed by the processor 1910 and 1960. The memory 1920 and 1970 may be located inside or outside of the processor 1910 and 1960 and may be connected to the processor 1910 and 1960 through a diversity of well-known means.

What is claimed is:

1. A method in a wireless local area network, WLAN, system, the method comprising:
configuring a Physical Protocol Data Unit, PPDU, by using at least one resource unit, RU, allocated for a data field of a receiving station, wherein each RU comprises one of a first type RU, a second type RU including a larger number of subcarriers than a first type RU and a third type RU including a larger number of subcarriers than a second type RU; and
transmitting the PPDU to the receiving station through a transmission band, the transmission band including first to fifth frequency bands each being contiguous with one another, a left guard band being contiguous with the first frequency band, and a right guard band being contiguous with the fifth frequency band,
wherein, in case a first type or second type RU is allocated within the first frequency band, a leftmost subcarrier of the first frequency band is a null subcarrier,
wherein, in case a first type or second type RU is allocated within the second frequency band, a leftmost subcarrier of the second frequency band is an only null subcarrier of the second frequency band,
wherein, in case a third type RU is allocated within the first and second frequency bands, the first and second frequency bands include no null subcarrier,
wherein, in case a first type or second type RU is allocated within the fourth frequency band, a rightmost subcarrier of the fourth frequency band is an only null subcarrier of the fourth frequency band,
wherein, in case a first type or second type RU is allocated within the fifth frequency band, a rightmost subcarrier of the fifth frequency band is a null subcarrier,
wherein, in case a third type RU is allocated within the fourth and fifth frequency bands, the fourth and fifth frequency bands include no null subcarrier.

2. The method of claim 1, wherein the third frequency band has a number of direct current, DC, subcarriers and a number of subcarriers for allocating a first type RU.

3. The method of claim 2, wherein the number of subcarriers for allocating a first type RU in the third frequency band are formed of two subcarrier groups, and wherein the DC subcarriers are between the two subcarrier groups.

4. The method of claim 2, wherein the first type RU includes 26 subcarriers, wherein the second type RU includes 52 subcarriers, wherein the third type RU includes 106 subcarriers, and wherein the DC subcarriers include 7 subcarriers.

5. The method of claim 4, wherein the third frequency band has 7 DC subcarriers and 26 subcarriers divided into two groups of 13 subcarriers on both sides of the 7 DC subcarriers.

6. The method of claim 1, wherein each of the first frequency band, the second frequency band, the fourth frequency band, and the fifth frequency band is configured based on a same number of subcarriers, and
wherein each of the first frequency band, the second frequency band, the fourth frequency band, and the fifth frequency band is used for a frequency band including two first type RUs and one null subcarrier.

7. The method of claim 6, wherein a band used for the first frequency band and the second frequency band has a same size as a band used for one third type RU.

8. The method of claim 1, wherein, in case the PPDU is configured for a plurality of receiving stations, a plurality of RUs are allocated within the PPDU, and the plurality of RUs are used for the plurality of receiving stations.

9. The method of claim 1, wherein the PPDU includes a control field and the data field, and wherein a subcarrier frequency spacing being applied to the control field is 4 times larger than a subcarrier frequency spacing being applied to the data field.

10. The method of claim 9, wherein a discrete Fourier transform, DFT, period being applied to each symbol of the control field is 4 times shorter than a DFT period being applied to each data symbol of the data field.

11. A wireless local area network, WLAN, station, comprising:
a transceiver configured to transmit and receive radio signals; and
a processor configured to control the transceiver, and
wherein the processor is further configured to:
configure a Physical Protocol Data Unit, PPDU, by using at least one resource unit, RU, allocated for a data field of a receiving station, wherein each RU comprises one of a first type RU, a second type RU including a larger number of subcarriers than a first type RU and a third type RU including a larger number of subcarriers than a second type RU, and transmit, via the transceiver, the PPDU to the receiving station through a transmission band, the transmission band including first to fifth frequency bands each being contiguous with one another, a left guard band being contiguous with the first frequency band, and a right guard band being contiguous with the fifth frequency band, wherein, in case a first type or second type RU is allocated within the first frequency band, a leftmost subcarrier of the first frequency band is a null subcarrier, wherein, in case a first type or second type RU is allocated within the second frequency band, a leftmost subcarrier of the second frequency band is an only null subcarrier of the second frequency band, wherein, in case a third type RU is allocated within the first and second frequency bands, the first and second frequency bands include no null subcarrier, wherein, in case a first type or second type RU is allocated within the fourth frequency band, a rightmost subcarrier of the fourth frequency band is an only null subcarrier of the fourth frequency band, wherein, in case a first type or second type RU is allocated within the fifth frequency band, a rightmost subcarrier of the fifth frequency band is a null subcarrier, wherein, in case a third type RU is allocated within the fourth and fifth frequency bands, the fourth and fifth frequency bands include no null subcarrier.

12. The WLAN station of claim 11, wherein the third frequency band has a number of direct current, DC, subcarriers and a number of subcarriers for allocating a first type RU.

13. The WLAN station of claim 12, wherein the number of subcarriers for allocating a first type RU in the third frequency band are formed of two subcarrier groups, and wherein the DC subcarriers are between the two subcarrier groups.

14. The WLAN station of claim 12, wherein the first type RU includes 26 subcarriers, wherein the second type RU includes 52 subcarriers, wherein the third type RU includes 106 subcarriers, and wherein the DC subcarriers include 7 subcarriers.

15. The WLAN station of claim 14, wherein the third frequency band has 7 DC subcarriers and 26 subcarriers divided into two groups of 13 subcarriers on both sides of the 7 DC subcarriers.

16. The WLAN station of claim 11, wherein each of the first frequency band, the second frequency band, the fourth frequency band, and the fifth frequency band is configured based on a same number of subcarriers, and wherein each of the first frequency band, the second frequency band, the fourth frequency band, and the fifth frequency band is used for a frequency band including two first type RUs and one null subcarrier.

17. The WLAN station of claim 16, wherein a band used for the first frequency band and the second frequency band has a same size as a band used for one third type RU.

18. The WLAN station of claim 11, wherein, in case the PPDU is configured for a plurality of receiving stations, a plurality of RUs are allocated within the PPDU, and the plurality of RUs are used for the plurality of receiving stations.

19. The WLAN station of claim 11, wherein the PPDU includes a control field and the data field, and wherein a subcarrier frequency spacing being applied to the control field is 4 times larger than a subcarrier frequency spacing being applied to the data field.

20. The WLAN station of claim 19, wherein a discrete Fourier transform, DFT, period being applied to each symbol of the control field is 4 times shorter than a DFT period being applied to each data symbol of the data field.

21. A wireless local area network, WLAN, station, comprising:
a transceiver configured to transmit and receive radio signals; and
a processor configured to control the transceiver, and
wherein the processor is further configured to:
receive, via the transceiver, a Physical Protocol Data Unit, PPDU, by using at least one resource unit, RU, allocated for a data field; and
decode the PPDU,
wherein each RU comprises one of a first type RU, a second type RU including a larger number of subcarriers than a first type RU and a third type RU including a larger number of subcarriers than a second type RU,
wherein the PPDU is received through a transmission band including first to fifth frequency bands each being contiguous with one another, a left guard band being contiguous with the first frequency band, and a right guard band being contiguous with the fifth frequency band,
wherein, in case a first type or second type RU is allocated within the first frequency band, a leftmost subcarrier of the first frequency band is a null subcarrier,
wherein, in case a first type or second type RU is allocated within the second frequency band, a leftmost subcarrier of the second frequency band is an only null subcarrier of the second frequency band,
wherein, in case a third type RU is allocated within the first and second frequency bands, the first and second frequency bands include no null subcarrier,
wherein, in case a first type or second type RU is allocated within the fourth frequency band, a rightmost subcarrier of the fourth frequency band is an only null subcarrier of the fourth frequency band,
wherein, in case a first type or second type RU is allocated within the fifth frequency band, a rightmost subcarrier of the fifth frequency band is a null subcarrier,
wherein, in case a third type RU is allocated within the fourth and fifth frequency bands, the fourth and fifth frequency bands include no null subcarrier.

22. The WLAN station of claim 21, wherein the third frequency band has a number of direct current, DC, subcarriers and a number of subcarriers for allocating a first type RU.

23. The WLAN station of claim 22, wherein the number of subcarriers for allocating a first type RU in the third frequency band are formed of two subcarrier groups, and wherein the DC subcarriers are between the two subcarrier groups.

24. The WLAN station of claim 22, wherein the first type RU includes 26 subcarriers, wherein the second type RU includes 52 subcarriers, wherein the third type RU includes 106 subcarriers, and wherein the DC subcarriers include 7 subcarriers.

25. The WLAN station of claim 24, wherein the third frequency band has 7 DC subcarriers and 26 subcarriers divided into two groups of 13 subcarriers on both sides of the 7 DC subcarriers.

\* \* \* \* \*